(12) United States Patent
Shirai

(10) Patent No.: US 9,540,063 B1
(45) Date of Patent: Jan. 10, 2017

(54) BICYCLE ACTUATION STRUCTURE AND BICYCLE SEATPOST ASSEMBLY

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/879,126

(22) Filed: Oct. 9, 2015

(51) Int. Cl.
*B62J 1/02* (2006.01)
*B62J 1/08* (2006.01)
*B62J 1/10* (2006.01)

(52) U.S. Cl.
CPC .............. *B62J 1/08* (2013.01); *B62J 2001/085* (2013.01)

(58) Field of Classification Search
CPC ........................................................ B62J 1/08
USPC .............................. 297/215.13; 74/502.2, 491
See application file for complete search history.

(56) References Cited

U.S. PATENT DOCUMENTS

| | | | | |
|---|---|---|---|---|
| 3,861,740 A | * | 1/1975 | Tajima | B62K 19/36 297/215.13 X |
| 6,220,582 B1 | | 4/2001 | Wandschneider | |
| 7,673,936 B2 | * | 3/2010 | Hsu | B62J 1/08 297/215.13 |
| 8,177,251 B2 | * | 5/2012 | Shirai | B62J 1/08 297/215.13 X |
| 8,191,964 B2 | * | 6/2012 | Hsu | B62J 1/08 297/215.13 X |
| 8,328,454 B2 | * | 12/2012 | McAndrews | B62J 1/08 297/215.13 |
| 8,398,104 B2 | * | 3/2013 | Hsu | B62J 1/08 297/215.13 X |
| 8,894,025 B2 | * | 11/2014 | Wehage | B62J 1/06 297/215.13 X |
| 2011/0187166 A1 | * | 8/2011 | Walsh | B62J 1/06 297/215.13 |
| 2012/0104810 A1 | * | 5/2012 | Walsh | B62K 19/36 297/215.13 |
| 2012/0228906 A1 | * | 9/2012 | McAndrews | B62J 1/08 297/215.13 |
| 2013/0221713 A1 | * | 8/2013 | Pelot | B62J 1/02 297/215.13 |
| 2013/0307299 A1 | * | 11/2013 | Winefordner | B62J 1/08 297/215.13 |
| 2014/0305253 A1 | | 10/2014 | Tseng | |
| 2015/0232142 A1 | * | 8/2015 | Shirai | B62J 1/08 403/104 |

FOREIGN PATENT DOCUMENTS

EP        2886428        6/2015

* cited by examiner

*Primary Examiner* — Rodney B White

(74) *Attorney, Agent, or Firm* — Mori & Ward, LLP

(57) ABSTRACT

A bicycle actuation structure comprises an input member, a coupling member, and an output member. The input member is configured to receive a pulling force to move in a first direction. The coupling member is pivotally coupled to the input member about a first pivot axis. The output member is pivotally coupled to the coupling member about a second pivot axis to move in a second direction opposite to the first direction in response to a movement of the input member in the first direction, the second pivot axis being different from the first pivot axis.

21 Claims, 17 Drawing Sheets

BICYCLE ACTUATION STRUCTURE AND BICYCLE SEATPOST ASSEMBLY

BACKGROUND OF THE INVENTION

Field of the Invention

The present invention relates to a bicycle actuation structure and a bicycle seatpost assembly.

Discussion of the Background

Bicycling is becoming an increasingly more popular forth of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle actuation structure.

SUMMARY OF THE INVENTION

In accordance with a first aspect of the present invention, a bicycle actuation structure comprises an input member, a coupling member, and an output member. The input member is configured to receive a pulling force to move in a first direction. The coupling member is pivotally coupled to the input member about a first pivot axis. The output member is pivotally coupled to the coupling member about a second pivot axis to move in a second direction opposite to the first direction in response to a movement of the input member in the first direction, the second pivot axis being different from the first pivot axis.

With the bicycle actuation structure according to the first aspect, the output member is pivotally coupled to the coupling member about the second pivot axis to move in the second direction opposite to the first direction in response to the movement of the input member in the first direction. Accordingly, it is possible to effectively convert the pulling force into a pushing force.

In accordance with a second aspect of the present invention, the bicycle seatpost assembly according to the first aspect is configured so that the output member includes a transmitting part to transmit a movement of the output member in the second direction to a receiving member.

With the bicycle actuation structure according to the second aspect, it is possible to move the receiving member in the second direction by transmitting the movement of the output member to the receiving member via the transmitting part.

In accordance with a third aspect of the present invention, the bicycle seatpost assembly according to the first or second aspect is configured so that the second direction is substantially parallel to the first direction.

With the bicycle actuation structure according to the third aspect, it is possible to effectively convert the pulling force into the pushing force in an opposite direction of the pulling force.

In accordance with a fourth aspect of the present invention, the bicycle seatpost assembly according to the third aspect is configured so that the input member is movable on a reference axis in the first direction when viewed from a third direction parallel to the first pivot axis. The output member is movable on the reference axis in the second direction when viewed from the third direction.

With the bicycle actuation structure according to the fourth aspect, it is possible to more effectively convert the pulling force into the pushing force compared with a case where the output member is offset from the reference axis in the second direction viewed from the third direction.

In accordance with a fifth aspect of the present invention, the bicycle seatpost assembly according to the fourth aspect is configured so that the input member includes a cable attachment part configured to be coupled to a control cable. The output member includes a transmitting part to transmit a movement of the output member in the second direction. The cable attachment part is movable on the reference axis in the first direction when viewed from a third direction parallel to the first pivot axis. The transmitting part is movable on the reference axis in the second direction when viewed from the third direction. The cable attachment part and the transmitting part overlap with each other when viewed from the first direction.

With the bicycle actuation structure according to the fifth aspect, it is possible to it is possible to more effectively convert the pulling force into the pushing force compared with a case where the cable attachment part and the transmitting part do not overlap with each other when viewed from the first direction.

In accordance with a sixth aspect of the present invention, the bicycle seatpost assembly according to any one of the first to fifth aspects further comprises a supporting member. The coupling member is pivotally coupled to the supporting member about a support pivot axis provided between the first pivot axis and the second pivot axis.

With the bicycle actuation structure according to the sixth aspect, it is possible to stabilize the movement of the coupling member by the supporting member. This can improve a conversion efficiency of force compared with a case where the bicycle actuation structure does not include the support member.

In accordance with a seventh aspect of the present invention, the bicycle seatpost assembly according to the sixth aspect is configured so that the supporting member includes a guiding part to guide at least one of the input member, the coupling member, and the output member.

With the bicycle actuation structure according to the seventh aspect, it is possible to stabilize the movement of at least one of the input member, the coupling member, and the output member by the guiding part. This can improve the conversion efficiency of force compared with a case where the support member does not include the guiding part.

In accordance with an eighth aspect of the present invention, the bicycle seatpost assembly according to the seventh aspect is configured so that the guiding part includes a first guiding portion and a second guiding portion spaced apart from the first guiding portion. The at least one of the input member, the coupling member, and the output member is provided between the first guiding portion and the second guiding portion. The first guiding portion and the second guiding portion restrict a movement of the at least one of the input member, the coupling member, and the output member in a third direction parallel to the first pivot axis.

With the bicycle actuation structure according to the eighth aspect, it is possible to reduce loss of the movement of the at least one of the input member, the coupling member, and the output member. This can improve the conversion efficiency of force compared with a case where the guiding part does not include the first guiding portion and the second guiding portion.

In accordance with a ninth aspect of the present invention, the bicycle seatpost assembly according to any one of the sixth to eighth aspects is configured so that a first distance defined between the first pivot axis and the support pivot axis is longer than a second distance defined between the second pivot axis and the support pivot axis.

With the bicycle actuation structure according to the ninth aspect, it is possible to make the pushing force larger than the pulling force.

In accordance with a tenth aspect of the present invention, the bicycle seatpost assembly according to any one of the sixth to ninth aspects further comprises a support pivot pin pivotally coupling the coupling member to the supporting member about the support pivot axis. The output member includes a support elongated hole. The support pivot pin extends through the support elongated hole.

With the bicycle actuation structure according to the tenth aspect, it is possible to guide the output member by the support pivot pin and the support elongated hole. This can stabilize the movement of the output member.

In accordance with an eleventh aspect of the present invention, the bicycle seatpost assembly according to the tenth aspect is configured so that the support elongated hole extends in the second direction.

With the bicycle actuation structure according to the eleventh aspect, it is possible to stabilize the movement of the output member in the second direction. This can improve the conversion efficiency of force compared with a case where the support elongated hole extends in a direction other than the second direction.

In accordance with a twelfth aspect of the present invention, the bicycle seatpost assembly according to the tenth or eleventh aspect further comprises a first pivot pin pivotally coupling the coupling member to the input member about the first pivot axis. At least one of the input member and the coupling member includes a first elongated hole. The first pivot pin extends through the first elongated hole.

With the bicycle actuation structure according to the twelfth aspect, the first elongated hole can reduce interference between the first pivot pin and the coupling member. This can make the movement of the input member and the coupling member smoother than a case where the first pivot pin extends through a round hole.

In accordance with a thirteenth aspect of the present invention, the bicycle seatpost assembly according to the twelfth aspect is configured so that the first elongated hole extends in a fourth direction perpendicular to each of the first pivot axis and the first direction.

With the bicycle actuation structure according to the thirteenth aspect, it is possible to more improve the conversion efficiency of force with reducing interference between the first pivot pin and the coupling member compared with a case where the first elongated hole extends in a direction other than the fourth direction.

In accordance with a fourteenth aspect of the present invention, the bicycle seatpost assembly according to the twelfth or thirteenth aspect further comprises a second pivot pin pivotally coupling the output member to the coupling member about the second pivot axis. At least one of the coupling member and the output member includes a second elongated hole. The second pivot pin extends through the second elongated hole.

With the bicycle actuation structure according to the fourteenth aspect, the second elongated hole can reduce interference between the second pivot pin and the coupling member. This can make the movement of the input member and the coupling member smoother than a case where the second pivot pin extends through a round hole.

In accordance with a fifteenth aspect of the present invention, the bicycle seatpost assembly according to the fourteenth aspect is configured so that the second elongated hole extends a fifth direction perpendicular to each of the second pivot axis and the second direction.

With the bicycle actuation structure according to the fifteenth aspect, it is possible to more improve the conversion efficiency of force with reducing interference between the second pivot pin and the coupling member compared with a case where the second elongated hole extends in a direction other than the fifth direction.

In accordance with a sixteenth aspect of the present invention, the bicycle seatpost assembly according to any one of the fourth to fifteenth aspects further comprises an additional coupling member pivotally coupled to the input member about a third pivot axis. The output member is pivotally coupled to the additional coupling member about a fourth pivot axis to move in the second direction in response to the movement of the input member in the first direction. The coupling member and the additional coupling member are provided symmetrically with respect to the reference axis when viewed from the third direction.

With the bicycle actuation structure according to the sixteenth aspect, the additional coupling member can improve the coupling strength of the bicycle actuation structure compared with a case where the bicycle actuation structure does not include the additional coupling member.

In accordance with a seventeenth aspect of the present invention, a bicycle seatpost assembly comprises a first cylinder, a second cylinder, a positioning structure, and the bicycle actuation structure according to any one of the first to sixteenth aspects. The second cylinder is telescopically received in the first cylinder in a telescopic direction. The positioning structure is to change a state of the bicycle seatpost assembly between a locked state where the second cylinder is positioned relative to the first cylinder in the telescopic direction, and an adjustable state where a position of the second cylinder is adjustable relative to the first cylinder in the telescopic direction. The output member is operatively coupled to the positioning structure to change the state of the bicycle seatpost assembly between the locked state and the adjustable state in response to the movement of the input member.

With the bicycle actuation structure according to the seventeenth aspect, it is possible to effectively convert the pulling force into the pushing force in the bicycle actuation structure. Accordingly, it is possible to change the state of the positioning structure via the bicycle actuation structure by moving the input member.

In accordance with an eighteenth aspect of the present invention, the bicycle seatpost assembly according to the seventeenth aspect is configured so that the positioning structure includes a hydraulic valve to change the state of the bicycle seatpost assembly between the locked state and the adjustable state. The output member is operatively coupled to the hydraulic valve to operate the hydraulic valve in response to the movement of the input member.

With the bicycle actuation structure according to the eighteenth aspect, it is possible to transmit the movement of the input member to the hydraulic valve via the coupling member and the output member.

In accordance with a nineteenth aspect of the present invention, the bicycle seatpost assembly according to the seventeenth or eighteenth aspect is configured so that the positioning structure includes a motor to change the state of the bicycle seatpost assembly between the locked state and the adjustable state. The output member is operatively coupled to the motor to operate the motor in response to the movement of the input member.

With the bicycle actuation structure according to the nineteenth aspect, it is possible to transmit the movement of the input member to the motor via the coupling member and the output member. Thus, it is possible to operate the pulling the input member.

In accordance with a twentieth aspect of the present invention, the bicycle seatpost assembly according to any one of the seventeenth to nineteenth aspects is configured so that the bicycle actuation structure is provided at a lower end of the first cylinder in a state where the bicycle seatpost assembly is mounted to a bicycle frame.

With the bicycle actuation structure according to the twentieth aspect, it is possible to arrange the bicycle actuation structure in the bicycle frame, improving an appearance of a bicycle with effectively converting the pulling force into the pushing force in the bicycle actuation structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
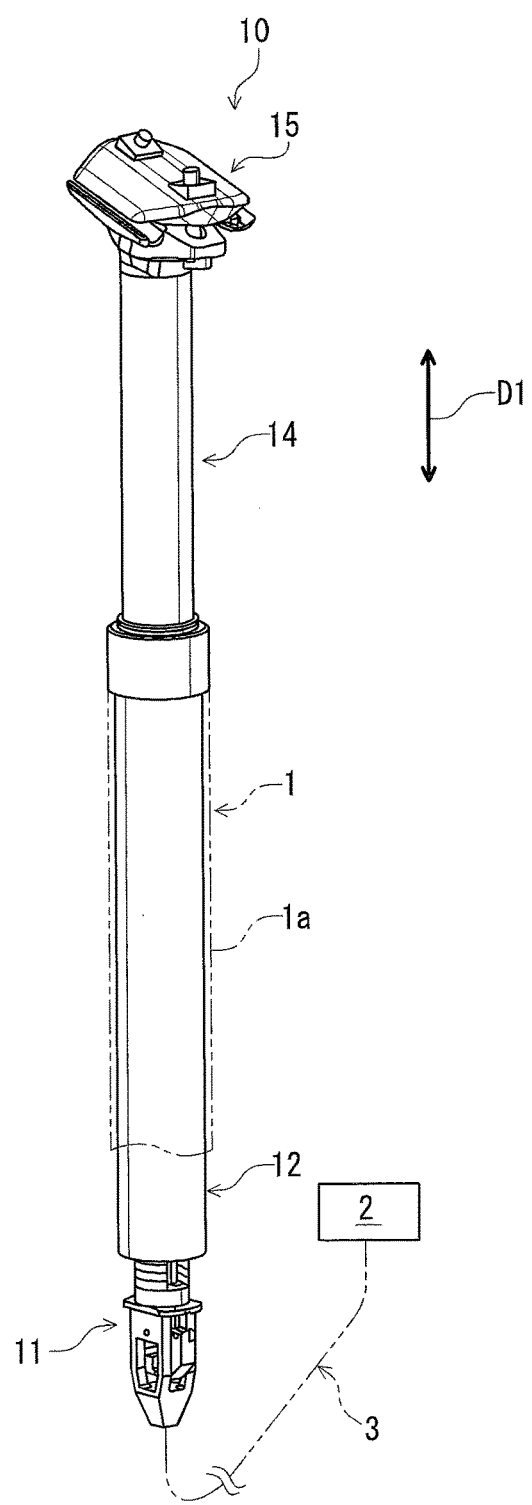
FIG. 1 is a perspective view of a bicycle seatpost assembly including a bicycle actuation structure in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle seatpost assembly 10 comprises a bicycle actuation structure 11 in accordance with a first embodiment. The bicycle seatpost assembly 10 comprises a first cylinder 12 and a second cylinder 14. The second cylinder 14 is configured to be telescopically received in the first cylinder 12 in a telescopic direction D1. The first cylinder 12 and the second cylinder 14 are configured to be movable relative to each other. The first cylinder 12 is detachably attached to a seat tube 1a of a bicycle frame 1. The bicycle seatpost assembly 10 comprises a mounting structure 15 configured to fixedly mount a bicycle saddle (not shown) to the second cylinder 14. The mounting structure 15 is attached to an upper end of the second cylinder 14.

Figure 2:
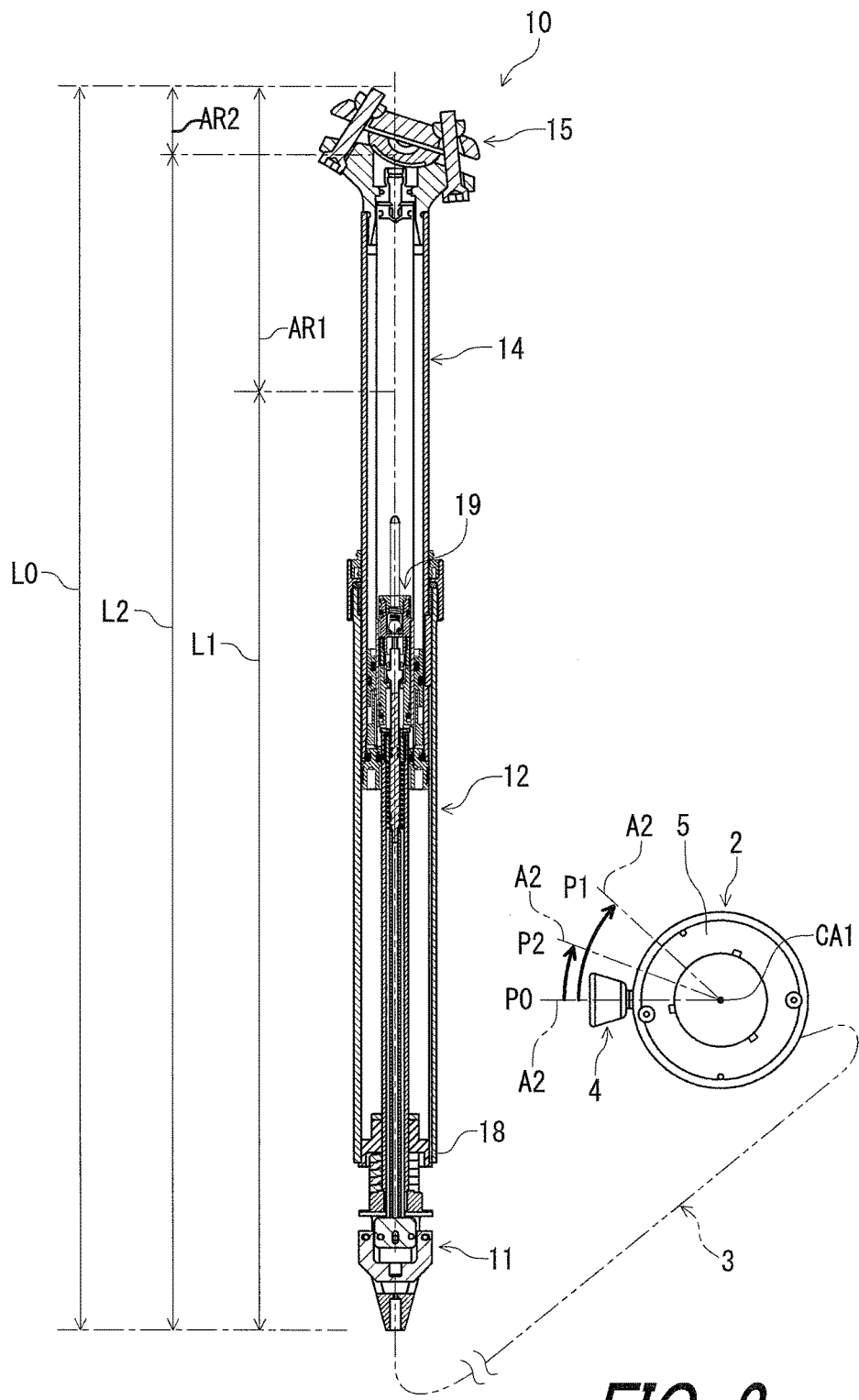
FIG. 2 is a cross-sectional view of the bicycle seatpost assembly illustrated in FIG. 1.

As seen in FIG. 2, the bicycle seatpost assembly 10 comprises a positioning structure 16. The positioning structure 16 is configured to relatively position the first cylinder 12 and the second cylinder 14. The positioning structure 16 is configured to be operated via an operating device 2. For example, the operating device 2 is mounted on a bicycle handlebar (not shown). The bicycle actuation structure 11 is configured to actuate the positioning structure 16. The bicycle actuation structure 11 is provided at a lower end 18 of the first cylinder 12 in a state where the bicycle seatpost assembly 10 is mounted to the bicycle frame 1. The bicycle actuation structure 11 can be provided at other positions in or outside the bicycle seatpost assembly 10. The bicycle actuation structure 11 is operatively coupled to an operating device 2 via a control cable 3 such as a Bowden cable.

In the present application, the following directional terms "forward", "rearward", "left", "right", "upward" and "downward" as well as any other similar directional terms refer to those directions which are determined on the basis of the rider who sits on the bicycle saddle (not shown) of a bicycle with facing the bicycle handlebar (not shown). Accordingly, these terms, as utilized to describe the bicycle seatpost assembly 10, should be interpreted relative to a bicycle equipped with the bicycle seatpost assembly 10 as used in an upright riding position on a horizontal surface.

As seen in FIG. 2, the operating device 2 is configured to output a first operation and a second operation different from the first operation. More specifically, the operating device 2 includes an operated member 4 and a base member 5. The operated member 4 is configured to be pivotable relative to the base member 5 from a rest position P0 to a first operated position P1 about a pivot axis A1. The operated member 4 is configured to be pivotable relative to the base member 5 from the rest position P0 to a second operated position P2 about the pivot axis A1. The second operated position P2 is defined between the rest position P0 and the first operated position P1. Each of the rest position P0, the second operated position P2, and the first operated position P1 is defined based on a center axis CA1 of the operated member 4.

The control cable 3 is pulled by a first amount of operation when the operated member 4 is pivoted relative to the base member 5 from the rest position P0 to the first operated position P1. The control cable 3 is pulled by a second amount of operation when the operated member 4 is pivoted relative to the base member 5 from the rest position P0 to the second operated position P2. The second amount of operation is different from the first amount of operation. In this embodiment, the first amount of operation is larger than the second amount of operation.

As seen in FIG. 2, the bicycle seatpost assembly 10 has a maximum overall length L0 and a minimum overall length L1. The overall length of the bicycle seatpost assembly 10 is adjustable within a first adjustable range AR1 defined as a difference between the maximum overall length L0 and the minimum overall length L1. The bicycle seatpost assembly 10 has an intermediate overall length L2. The intermediate overall length L2 is defined between the maximum overall length L0 and the minimum overall length L1.

The positioning structure 16 changes a state of the bicycle seatpost assembly 10 between a locked state and an adjustable state. In the locked state, the second cylinder 14 is positioned relative to the first cylinder 12 in the telescopic direction D1. The positioning structure 16 has a locked state and an adjustable state. In the locked state, the second cylinder 14 is positioned relative to the first cylinder 12 in the telescopic direction D1. Specifically, in the locked state, the overall length of the bicycle seatpost assembly 10 is maintained at an adjusted overall length. In the locked state, the first cylinder 12 and the second cylinder 14 are fixedly positioned relative to each other in the telescopic direction D1.

In the adjustable state, a position of the second cylinder 14 is adjustable relative to the first cylinder 12 in the telescopic direction D1. In this embodiment, the bicycle seatpost assembly 10 has a first adjustable state and a second adjustable state as the adjustable state. However, the bicycle seatpost assembly 10 can have one adjustment state or three or more adjustment states. In the first adjustable state, the overall length of the bicycle seatpost assembly 10 is continuously adjustable within the first adjustable range AR1 by operating the operated member 4 to the first operated position P1. Namely, in the first adjustable state, the positional relationship between the first cylinder 12 and the second cylinder 14 is continuously adjustable within the first adjustable range AR1.

In the second adjustable state, the overall length of the bicycle seatpost assembly 10 is adjustable to the intermediate overall length L2 by just operating the operated member 4 of the operating device 2 to the second operated position P2. More specifically, in the second adjustable state, the second cylinder 14 may stop relative to the first cylinder 12 at a position corresponding to the intermediate overall length L2 when the second cylinder 14 downwardly moves relative to the first cylinder 12 from a position corresponding to the maximum overall length L0 during the operation of the operated member 4 of the operating device 2 to the second operated position P2.

Furthermore, in the second adjustable state, the overall length of the bicycle seatpost assembly 10 is continuously adjustable within a second adjustable range AR2 by operating the operated member 4 of the operating device 2 to the second operated position P2. Namely, in the second adjustable state, the positional relationship between the first cylinder 12 and the second cylinder 14 is continuously adjustable within the second adjustable range AR2. The second adjustable range AR2 is defined as a difference between the maximum overall length L0 and the intermediate overall length L2.

As seen in FIG. 2, the first adjustable range AR1 and the second adjustable range AR2 are different from each other. In this embodiment, the second adjustable range AR2 entirely overlaps with the first adjustable range AR1 and is included in the first adjustable range AR1. The first adjustable range AR1 partially overlaps with the second adjustable range AR2.

The second adjustable range AR2 has a total length different from a total length of the first adjustable range AR1. In this embodiment, the total length of the second adjustable range AR2 is shorter than the total length of the first adjustable range AR1.

The adjustable state of the bicycle seatpost assembly 10 is not limited to this embodiment. The total length of the bicycle seatpost assembly 10 can be stepwise adjusted in the adjustable state. For example, the total length of the bicycle seatpost assembly 10 can be stepwise adjusted at each of different lengths.

The positioning structure 16 includes a hydraulic valve 20 to change the state of the bicycle seatpost assembly 10 between the locked state and the adjustable state. In this embodiment, the hydraulic valve 20 changes the state of the positioning structure 16 among the locked state, the first adjustable state, and the second adjustable state in response to the operation of the operating device 2.

The positioning structure 16 includes a support member 22, an inner tube 24, and a movable member 26. A lower end of the support member 22 is secured to the first cylinder 12. The support member 22 is movable integrally with the first cylinder 12 relative to the second cylinder 14 in the telescopic direction D1. An upper end of the inner tube 24 is secured to the second cylinder 14. The inner tube 24 is movable integrally with the second cylinder 14 relative to the first cylinder 12 in the telescopic direction D1. The support member 22 is movably provided in the inner tube 24. The movable member 26 is movably provided in the support member 22.

Figure 3:
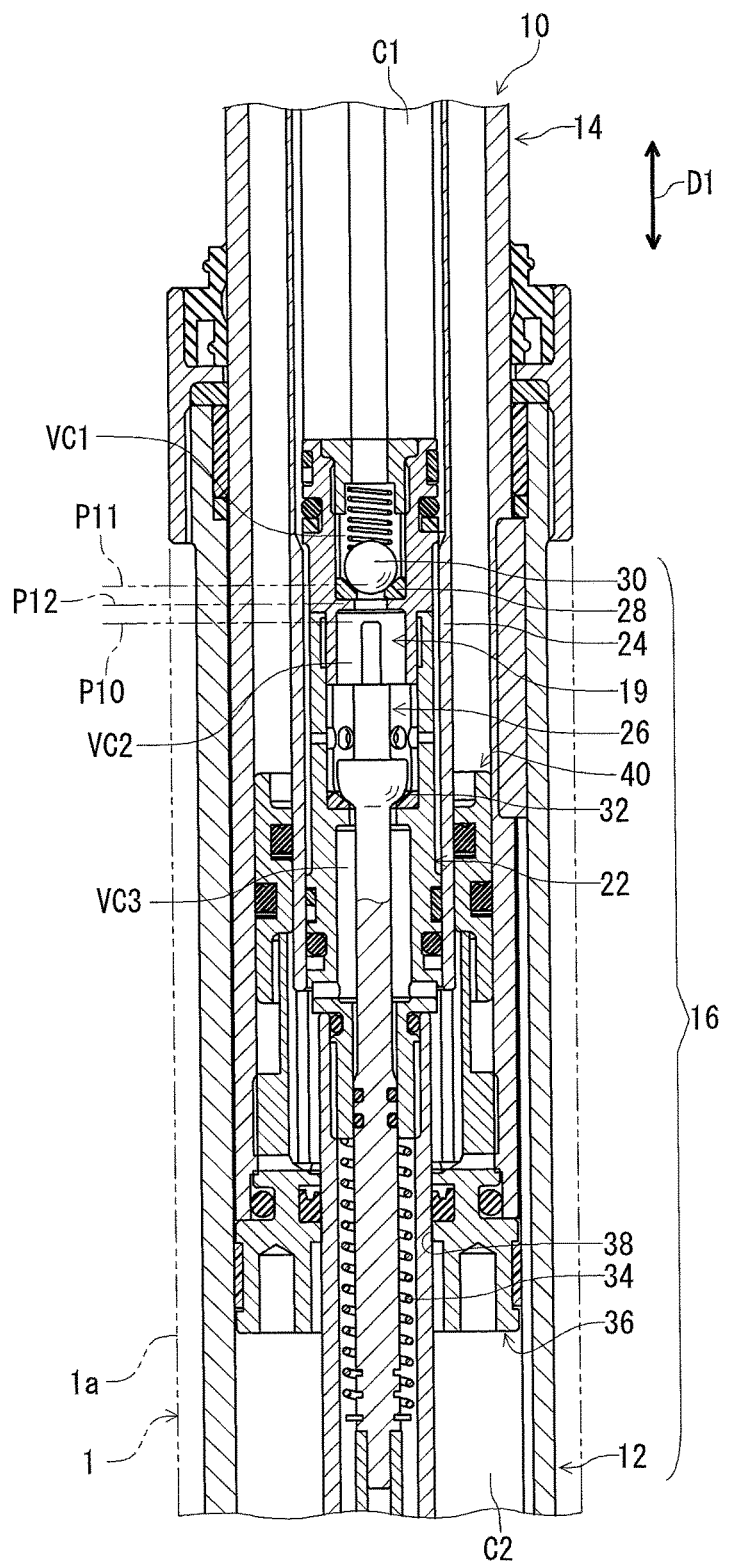
FIG. 3 is a partial cross-sectional view of the bicycle seatpost assembly illustrated in FIG. 1 (a closed position).

As seen in FIG. 3, the support member 22 includes a first valve chamber VC1, a second valve chamber VC2, and a third valve chamber VC3. The second valve chamber VC2 is provided between the first valve chamber VC1 and the third valve chamber VC3 in the telescopic direction D1.

The positioning structure 16 includes a first seal member 28, a valve member 30, and a second seal member 32. The positioning structure 16 has a closed state (FIG. 4), a first open state (FIG. 5), and a second open state (FIG. 6). The closed state corresponds to the locked state of the bicycle seatpost assembly 10. The first open state corresponds to the first adjustable state of the bicycle seatpost assembly 10. The second open state corresponds to the second adjustable state of the bicycle seatpost assembly 10.

The movable member 26 is movable relative to the support member 22 and the first cylinder 12 in the telescopic direction D1 between a closed position P10 and a second open position P12 through a first open position P11. In the closed state (FIG. 4) of the positioning structure 16, the movable member 26 is positioned at the closed position P10. In the first open state (FIG. 5) of the positioning structure 16, the movable member 26 is positioned at the first open position P11. In the second open state (FIG. 6) of the positioning structure 16, the movable member 26 is positioned at the second open position P12. The second open position P12 is provided between the closed position P10 and the first open position P11 in the telescopic direction D1.

The positioning structure 16 includes a biasing element 34 to bias the movable member 26 relative to the support member 22 toward the closed position P10. The movable member 26 is positioned at the closed position P10 by a biasing force of the biasing element 34. The movable member 26 is moved from the closed position P10 toward the first open position P11 relative to the support member 22 against a biasing force of the biasing element 34. The position of the movable member 26 is continuously adjustable relative to the support member 22 between the closed position P10 and the first open position P11 using the operating device 2 (FIG. 2).

As seen in FIG. 3, the positioning structure 16 includes a sealing structure 36 having an annular shape. The sealing structure 36 is secured to a lower end of the second cylinder 14. A lower end of the inner tube 24 is secured to the sealing structure 36. The sealing structure 36 includes a guide hole 38 extending in the telescopic direction D1. The support member 22 extends through the guide hole 38 of the sealing structure 36 in the telescopic direction D1.

The positioning structure 16 includes a piston 40 having an annular shape. The piston 40 includes a guide hole 42 extending in the telescopic direction D1. The inner tube 24 extends through the guide hole 42 of the piston 40 in the telescopic direction D1. The piston 40 is movable relative to the second cylinder 14 and the inner tube 24 in the telescopic direction D1.

As seen in FIG. 2, the positioning structure 16 includes a first chamber C1 and a second chamber C2. The first chamber C1 is defined by the support member 22, the inner tube 24, and the mounting structure 15. The second chamber C2 is defined by the first cylinder 12, the support member 22, and the sealing structure 36. The first chamber C1 is filled with a substantially incompressible fluid (e.g., oil), for example. The second chamber C2 is in communication with an outside of the bicycle seatpost assembly 10, for example.

Figure 4:
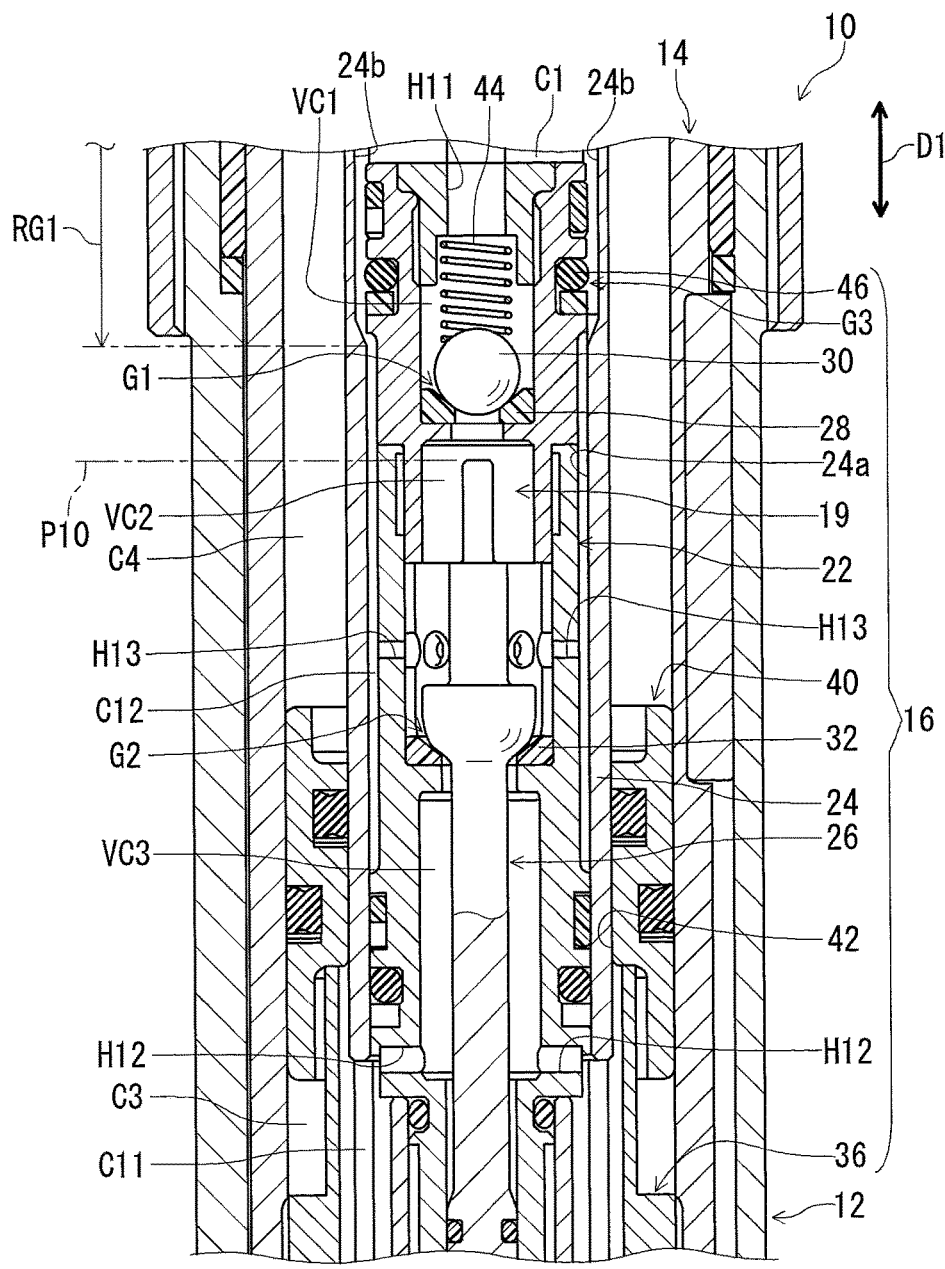
FIG. 4 is an enlarged partial cross-sectional view of the bicycle seatpost assembly illustrated in FIG. 1 (the closed position).

As seen in FIG. 4, a third chamber C3 is defined by the second cylinder 14, the inner tube 24, the sealing structure 36, and the piston 40. An intermediate chamber C12 is defined by the support member 22 and the inner tube 24. Each of the third chamber C3 and the intermediate chamber C12 is filled with the substantially incompressible fluid (e.g., oil), for example.

A biasing chamber C4 is defined by the second cylinder 14, the inner tube 24, the piston 40, and the mounting structure 15 (FIG. 2). A compressible fluid (e.g., air or gas other than air) is filled in the biasing chamber C4. The biasing chamber C4 is configured to apply a biasing force to the piston 40 so that the second cylinder 14 upwardly moves relative to the first cylinder 12 in the telescopic direction D1. The compressible fluid is compressed in the biasing chamber C4 in a state where the overall length of the bicycle seatpost assembly 10 is the maximum overall length L0 (FIG. 2).

As seen in FIG. 4, the positioning structure 16 includes a valve biasing member 44 to bias the valve member 30 against the first seal member 28. The movable member 26 moves the valve member 30 relative to the first seal member 28 against a biasing force of the valve biasing member 44 to open a first gate G1. The valve member 30 is provided between the first seal member 28 and the valve biasing member 44 in the telescopic direction D1. The valve member 30 is provided between the movable member 26 and the valve biasing member 44 in the telescopic direction D1. The valve biasing member 44 is provided in the first valve chamber VC1.

Figure 5:
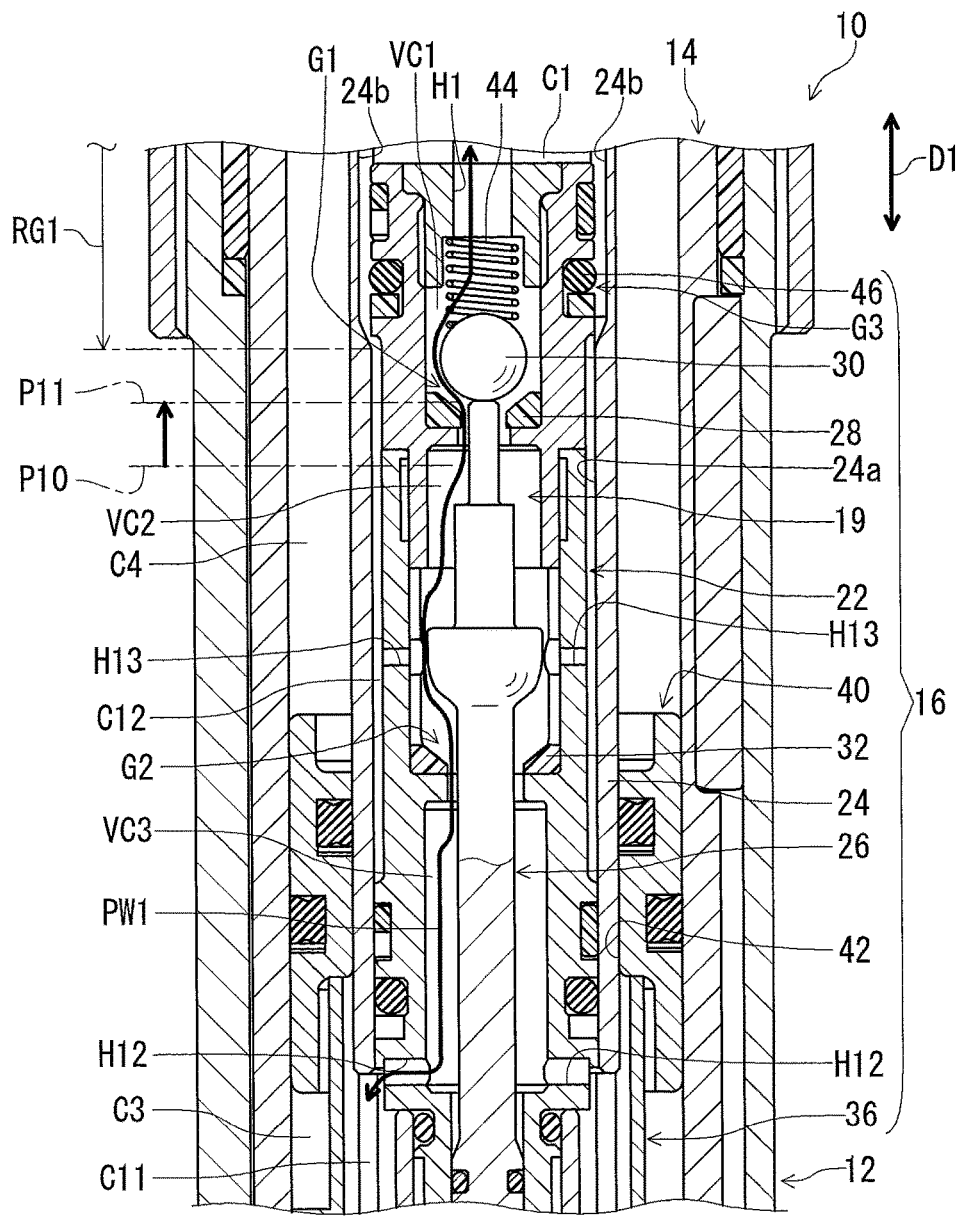
FIG. 5 is an enlarged partial cross-sectional view of the bicycle seatpost assembly illustrated in FIG. 1 (a first open position).
Figure 6:
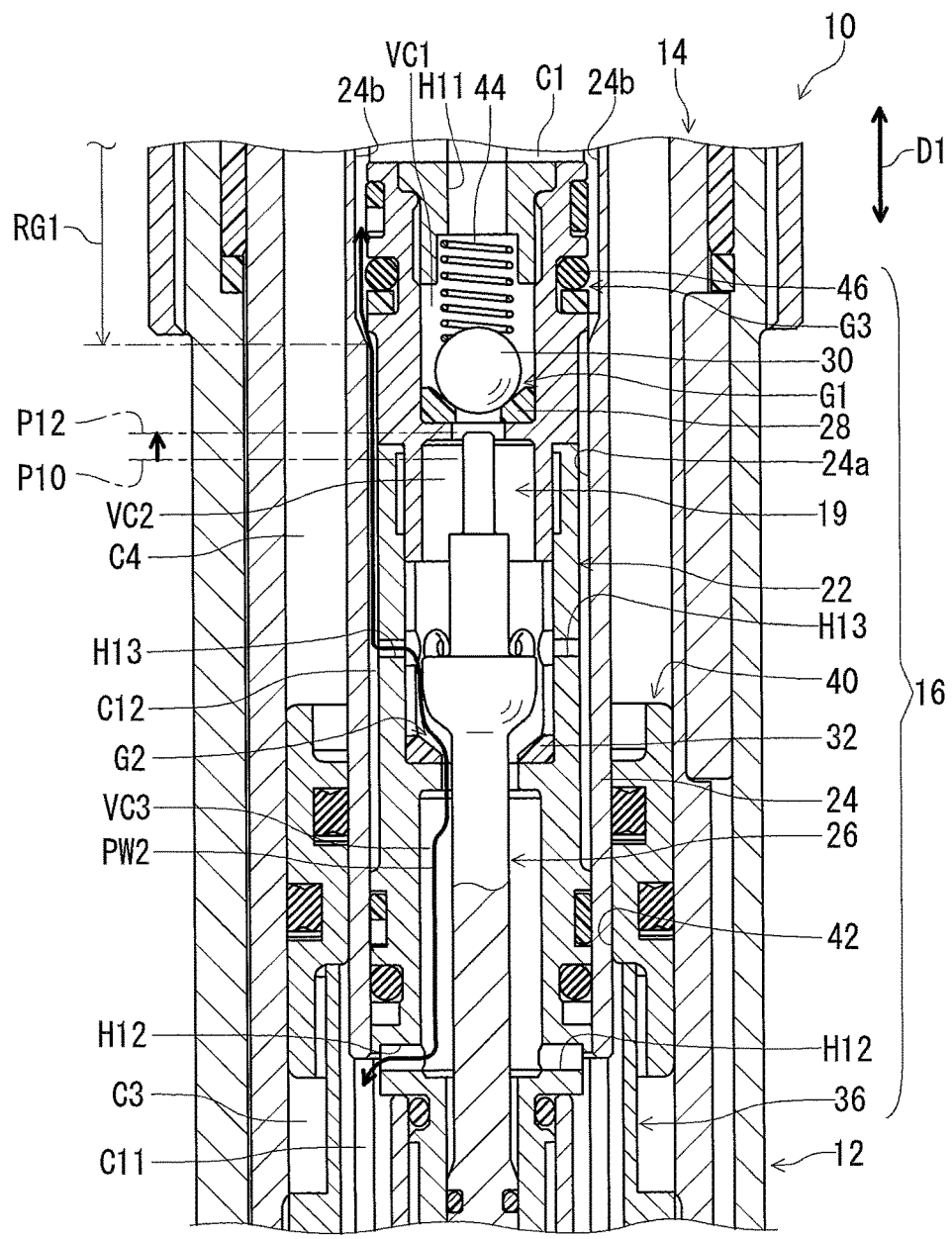
FIG. 6 is an enlarged partial cross-sectional view of the bicycle seatpost assembly illustrated in FIG. 1 (a second open position).

As seen in FIGS. 4 and 5, the valve member 30 provides the first gate G1 of a first passageway PW1 together with the first seal member 28. The valve member 30 is contactable with the first seal member 28 to close the first gate G1. The movable member 26 moves the valve member 30 relative to the first seal member 28 to open the first gate G1. The first valve chamber VC1 is in communication with the second valve chamber VC2 via the first gate G1 in a state where the first gate G1 is open.

When the movable member 26 is positioned at the closed position P10, the valve member 30 is in contact with the first seal member 28 to close the first gate G1. When the movable member 26 is positioned at the first open position P11, the valve member 30 is spaced apart from the first seal member 28 to open the first gate G1.

As seen in FIG. 4, the second seal member 32 provides a second gate G2 of a second passageway PW2 together with the movable member 26. The second valve chamber VC2 is in communication with the third valve chamber VC3 via the second gate G2 in a state where the second gate G2 is open.

When the movable member 26 is positioned at the closed position P10, the movable member 26 is in contact with the second seal member 32 to close the second gate G2. When the movable member 26 is positioned at the second open position P12, the movable member 26 is spaced apart from the second seal member 32 to open the second gate G2.

As seen in FIG. 5, the first passageway PW1 connects the first chamber C1 to the third chamber C3. More specifically, the support member 22 includes a first through-hole H11, second through-holes H12, and third through-holes H13. The first through-hole H11 connects the first chamber C1 to the first valve chamber VC1. The second through-holes H12 connects the third valve chamber VC3 to the third chamber C3. The third through-holes H13 connects the third valve chamber VC3 to the intermediate chamber C12. The first passageway PW1 includes the first through-hole H11, the first to third valve chambers VC1 to VC3, and the second through-holes H12.

Figure 7:
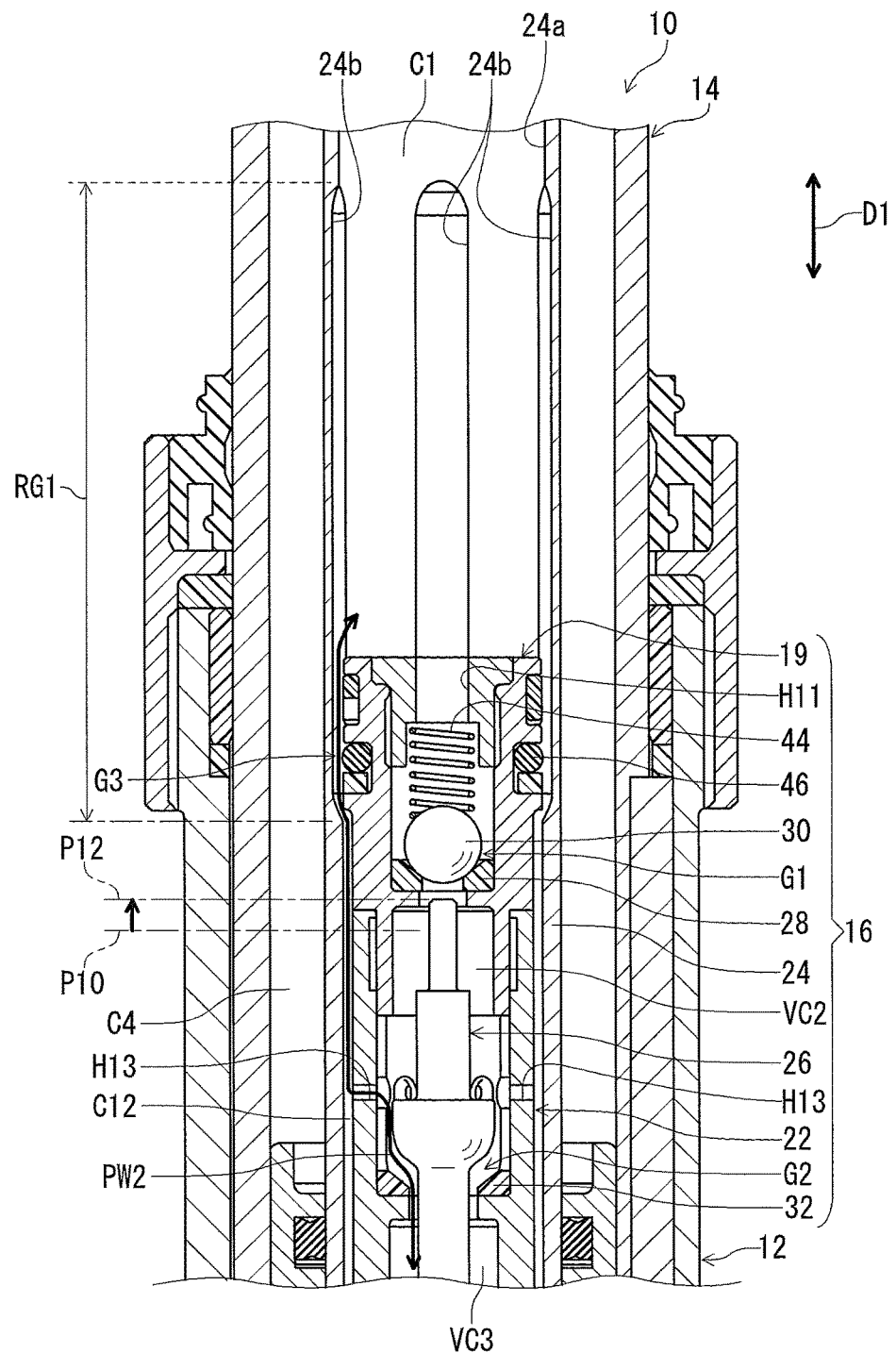
FIG. 7 is an enlarged partial cross-sectional view of the bicycle seatpost assembly illustrated in FIG. 1 (the second open position).

As seen in FIG. 7, the inner tube 24 includes an inner peripheral surface 24a and recesses 24b recessed from the inner peripheral surface 24a. The positioning structure 16 includes a third seal member 46 provided on an outer periphery of the support member 22.

The recesses 24b extend in the telescopic direction D1 and are circumferentially spaced apart from each other. The third seal member 46 is contactable with the inner peripheral surface 24a of the inner tube 24. The third seal member 46 provides a third gate G3 of the second passageway PW2 between the third seal member 46 and the inner tube 24. The third gate G3 is open in a state where the third seal member 46 is disposed within a range RG1 where the recesses 24b are provided.

Figure 8:
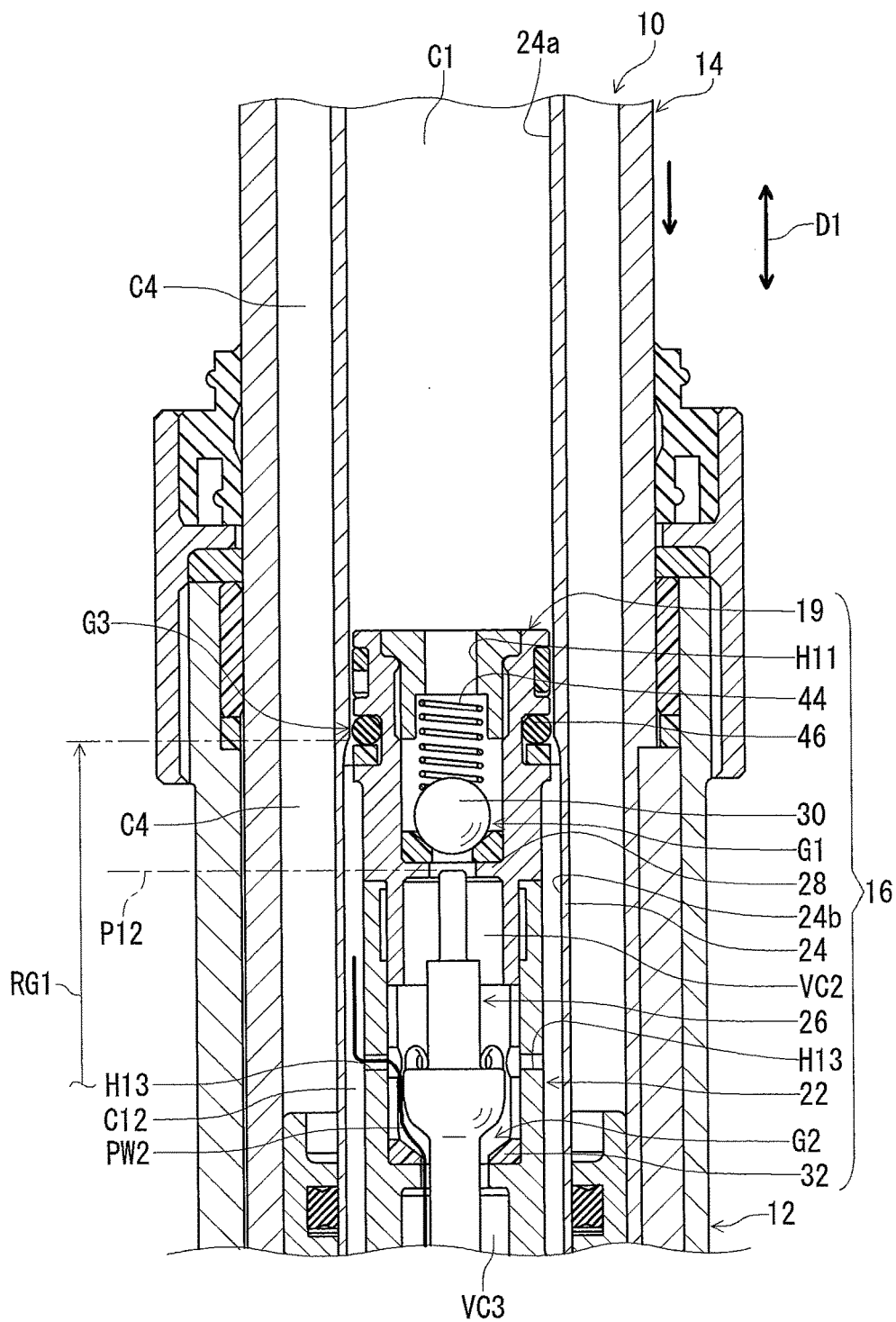
FIG. 8 is an enlarged partial cross-sectional view of the bicycle seatpost assembly illustrated in FIG. 1 (the second open position).

As seen in FIG. 8, the third gate G3 is closed in a state where the third seal member 46 is disposed outside the range RG1. For example, the third seal member 46 is in contact with the inner peripheral surface 24a of the inner tube 24 along an inner whole periphery of the inner tube 24 in a state where the third seal member 46 is disposed on an upper side of the recesses 24b. In this state, the third gate G3 is closed so that the first chamber C1 is not in communication with the third chamber C3 via the second passageway PW2. In this state, the total length of the bicycle seatpost assembly 10 is the intermediate overall length L2 (FIG. 2).

While the positioning structure 16 has a hydraulic structure in this embodiment, the positioning structure 16 can have other structures such as a mechanical structure and an electrical structure. For example, the positioning structure 16 can include an electrically-operated device such as a motor.

Figure 9:
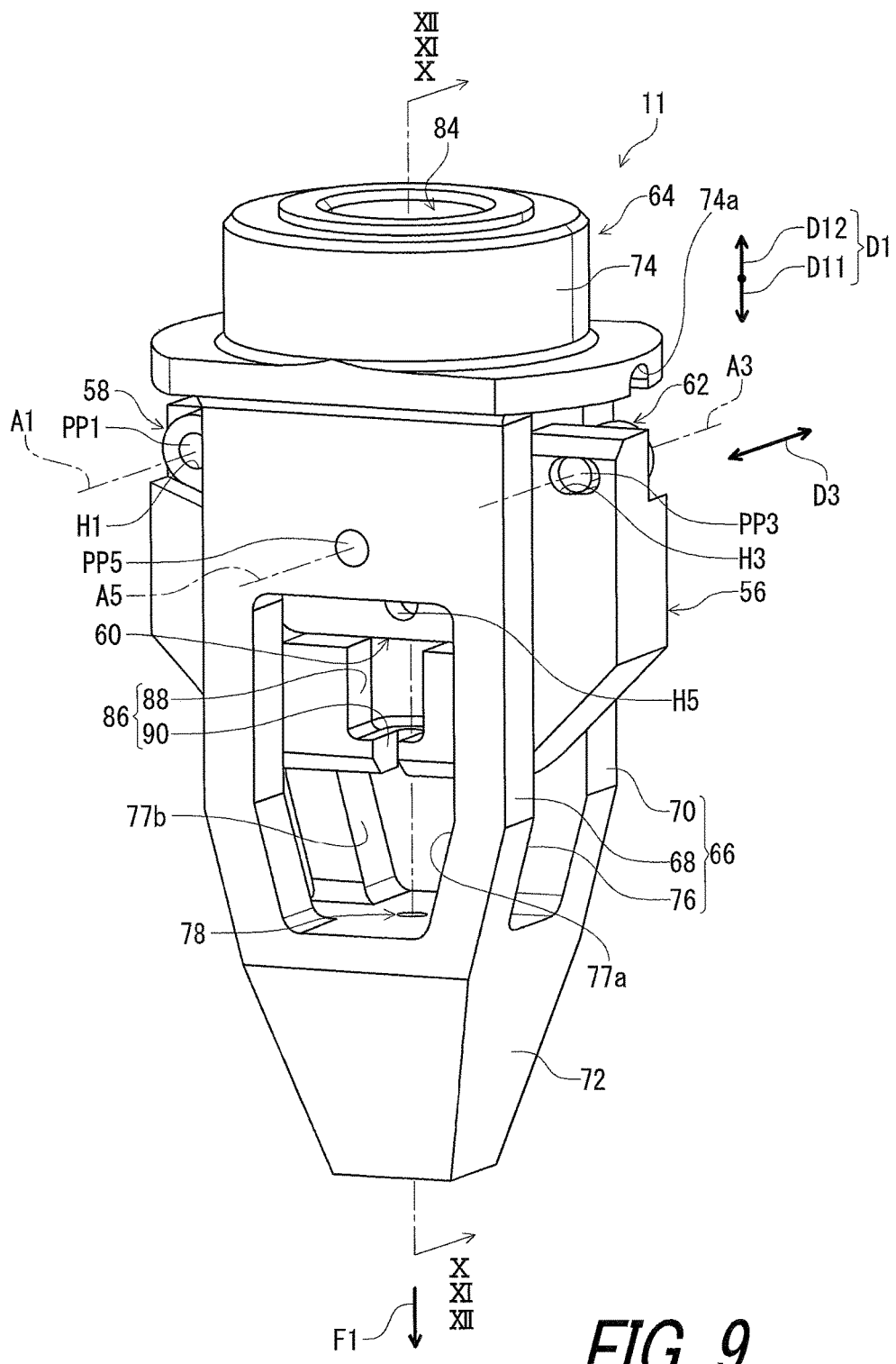
FIG. 9 is a perspective view of the bicycle actuation structure illustrated in FIG. 1 (an initial position).
Figure 10:
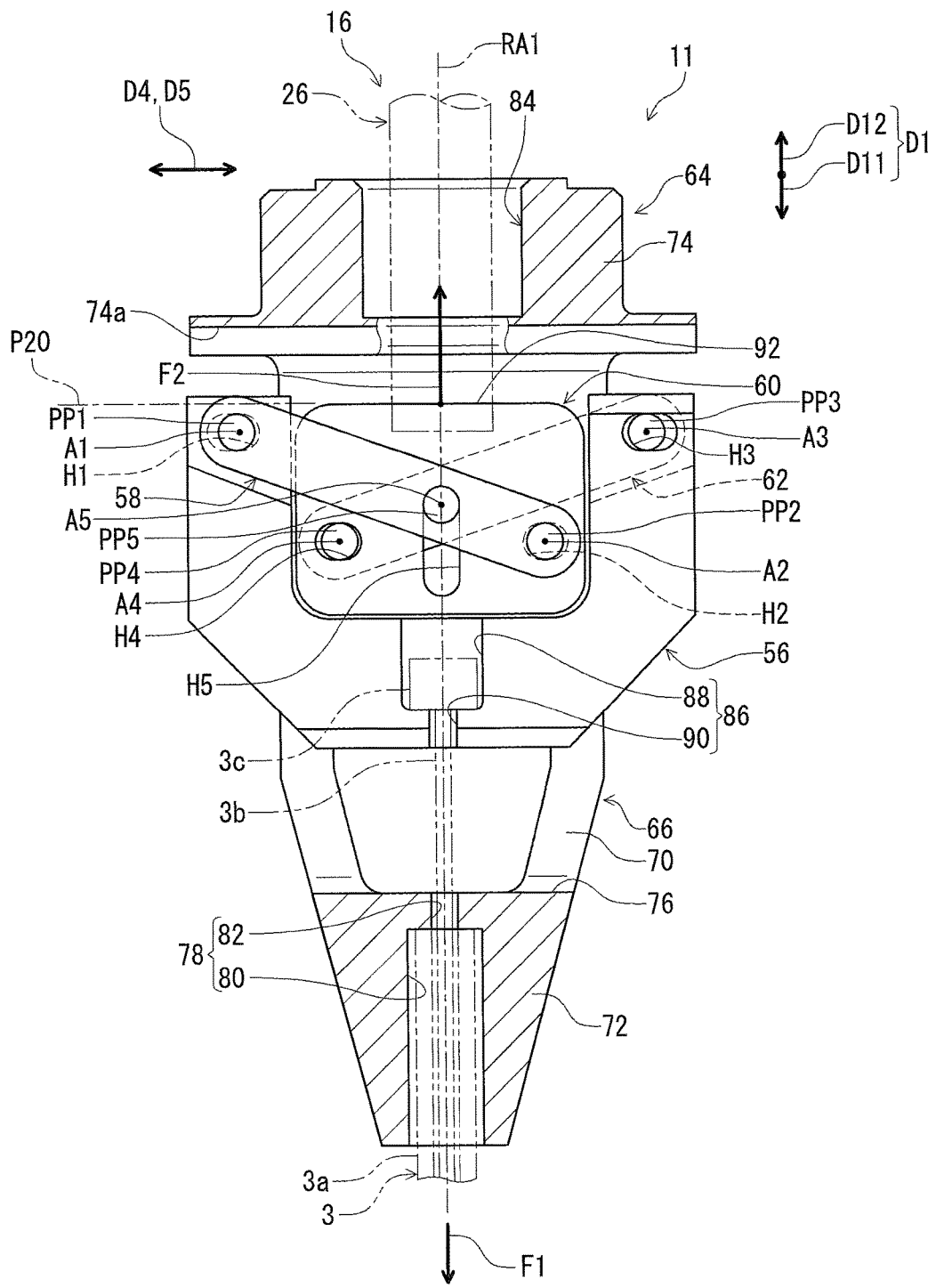
FIG. 10 is a cross-sectional view of the bicycle actuation structure taken along line X-X of FIG. 9 (the initial position).

As seen in FIGS. 9 and 10, the bicycle actuation structure 11 comprises an input member 56, a coupling member 58, and an output member 60. The input member 56 is configured to receive a pulling force F1 to move in a first direction D11. The coupling member 58 is pivotally coupled to the input member 56 about a first pivot axis A1. The output member 60 is pivotally coupled to the coupling member 58 about a second pivot axis A2 to move in a second direction D12 opposite to the first direction D11 in response to a movement of the input member 56 in the first direction D11. In this embodiment, for example, the coupling member 58 is an elongated link member. The input member 56 is a plate having a forked shape. The output member 60 is a plate. However, the shapes of the input member 56, the coupling member 58, and the output member 60 are not limited to this embodiment.

While the second direction D12 is substantially parallel to the first direction D11 in this embodiment, the second direction D12 can be angularly offset from the first direction D11. The first direction D11 and the second direction D12 are parallel to the telescopic direction D1. The second pivot axis A2 is different from the first pivot axis A1. In this embodiment, the second pivot axis A2 is substantially parallel to and spaced apart from the first pivot axis A1. However, the positional relationship between the first pivot axis A1 and the second pivot axis A2 is not limited to this embodiment.

In this embodiment, the input member 56 is operatively coupled to the control cable 3 to receive the pulling force F1 from the control cable 3. However, the input member 56 can be operatively coupled to other members such as a rod, a link, and a hydraulic piston.

The output member 60 is operatively coupled to the positioning structure 16 to change the state of the bicycle seatpost assembly 10 between the locked state and the adjustable state in response to the movement of the input member 56. In this embodiment, the bicycle actuation structure 11 is used to actuate the positioning structure 16 of the bicycle seatpost assembly 10. However, the bicycle actuation structure 11 can be applied to other devices, for example a bicycle suspension, derailleur, etc.

The output member 60 is operatively coupled to the hydraulic valve 20 to operate the hydraulic valve 20 in response to the movement of the input member 56. In this embodiment, the output member 60 is coupled to the movable member 26. The output member 60 can be operatively coupled to a member other than the hydraulic valve 20.

In this embodiment, the bicycle actuation structure 11 further comprises an additional coupling member 62 pivotally coupled to the input member 56 about a third pivot axis A3. The output member 60 is pivotally coupled to the additional coupling member 62 about a fourth pivot axis A4 to move in the second direction D12 in response to the movement of the input member 56 in the first direction D11.

In this embodiment, the fourth pivot axis A4 is substantially parallel to and spaced apart from the third pivot axis A3. The third pivot axis A3 is substantially parallel to and spaced apart from the first pivot axis A1 and the second pivot axis A2. The fourth pivot axis A4 is substantially parallel to and spaced apart from the first pivot axis A1 and the second pivot axis A2. However, the positional relationship between the first pivot axis A1, the second pivot axis A2, the third pivot axis A3, and the fourth pivot axis A4 is not limited to this embodiment.

While the bicycle actuation structure 11 includes the additional coupling member 62 in this embodiment, the additional coupling member 62 can be omitted from the bicycle actuation structure 11.

The bicycle actuation structure 11 further comprises a supporting member 64. The coupling member 58 is pivotally coupled to the supporting member 64 about a support pivot axis A5 provided between the first pivot axis A1 and the second pivot axis A2. However, the supporting member 64 can be omitted from the bicycle actuation structure 11. For example, the coupling member 58 can be directly coupled pivotally to the first cylinder 12. While the supporting member 64 is a separate member from the first cylinder 12 in this embodiment, the supporting member 64 can be integrally provided with the first cylinder 12.

In this embodiment, the support pivot axis A5 is substantially parallel to and spaced apart from each of the first to fourth pivot axes A1 to A4. However, the positional relationship between the first pivot axis A1, the second pivot axis A2, the third pivot axis A3, the fourth pivot axis A4, and the support pivot axis A5 is not limited to this embodiment.

Figure 11:
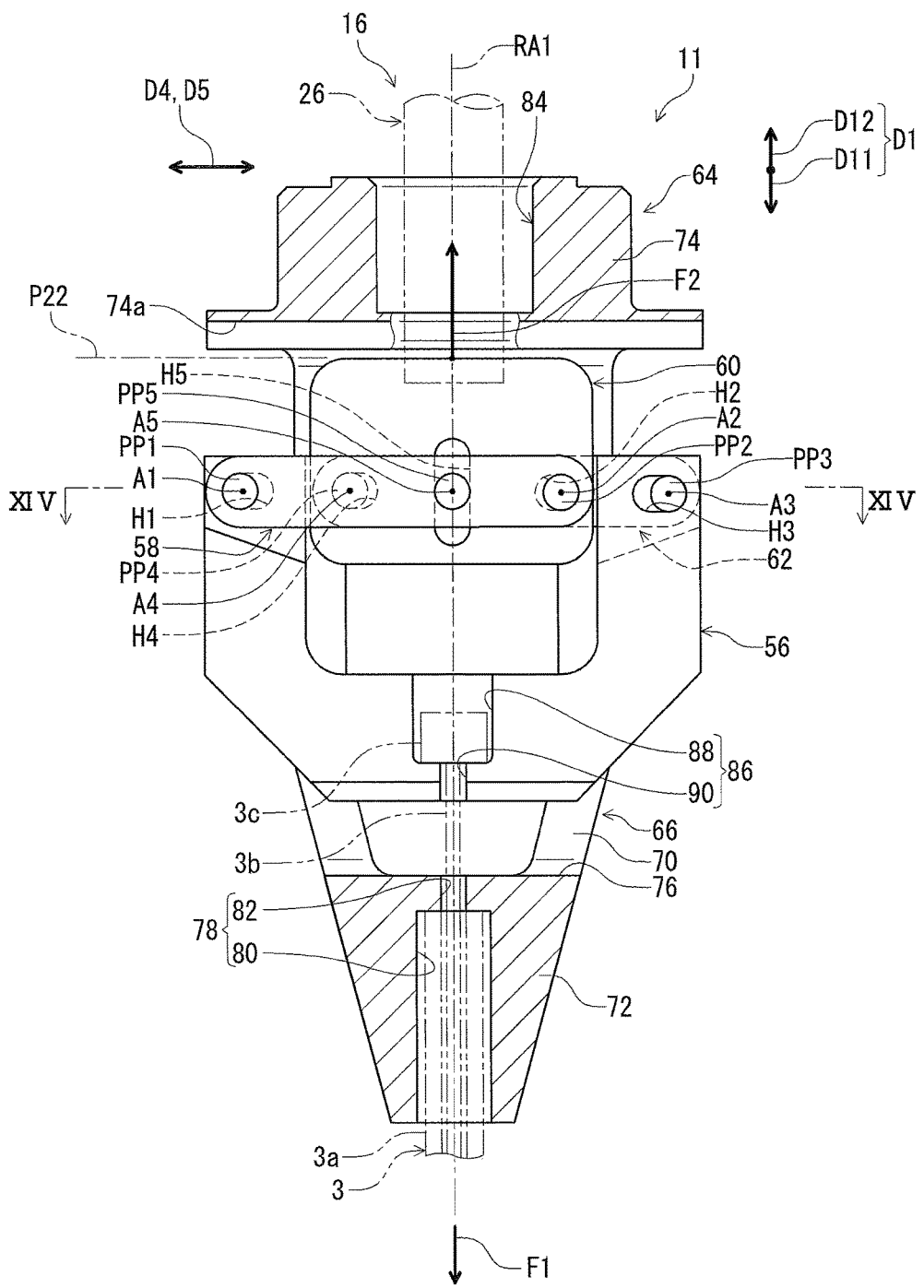
FIG. 11 is a cross-sectional view of the bicycle actuation structure taken along line XI-XI of FIG. 9 (an intermediate position).
Figure 12:
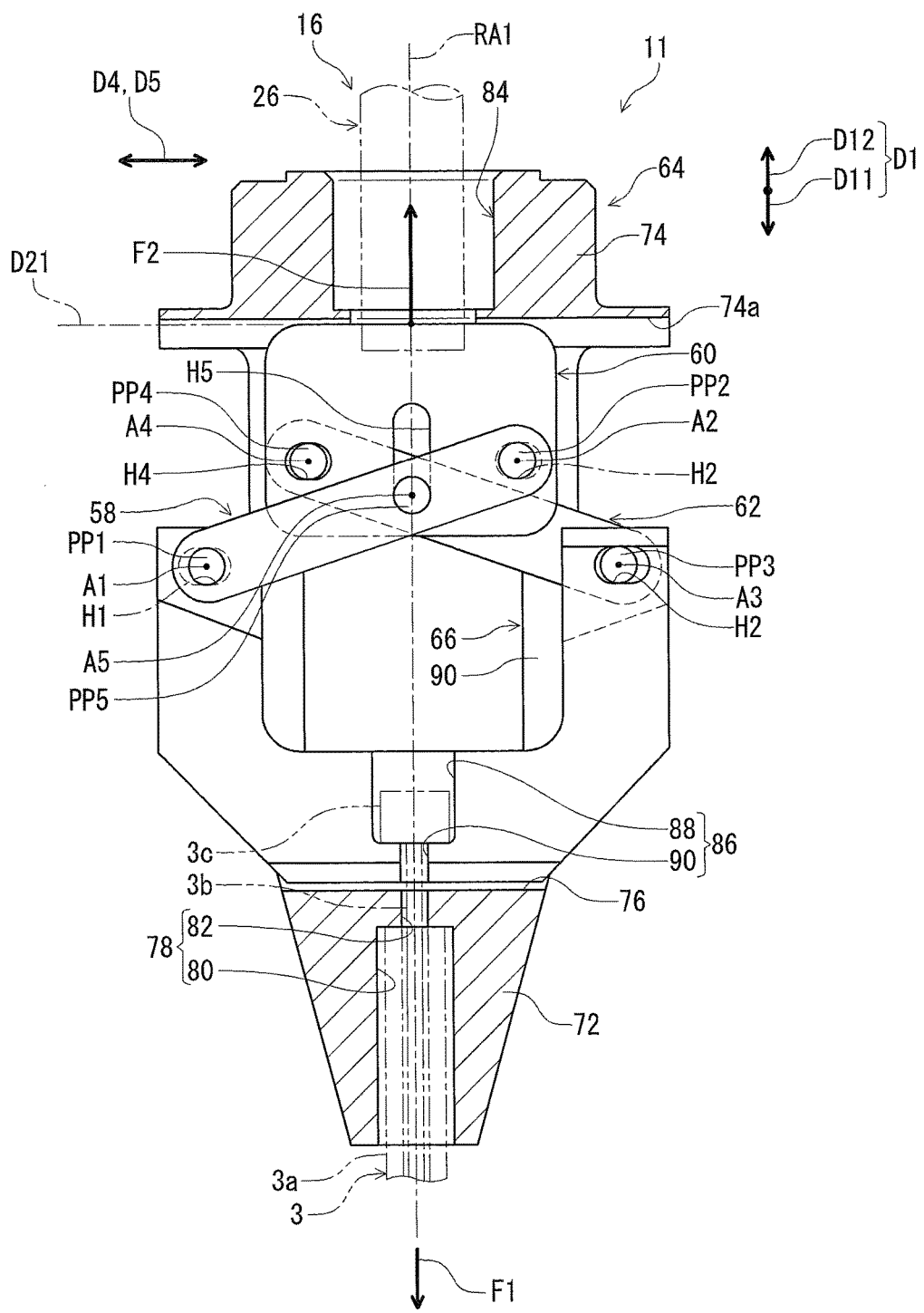
FIG. 12 is a cross-sectional view of the bicycle actuation structure taken along line XII-XII of FIG. 9 (an actuated position).

As seen in FIGS. 10 to 12, the input member 56 is movably coupled to the supporting member 64 by the coupling member 58 and the additional coupling member 62. The output member 60 is movably coupled to the supporting member 64 by the coupling member 58 and the additional coupling member 62. The input member 56 is movable relative to the supporting member 64 between an initial position P20 (FIG. 10) and an actuated position P21 (FIG. 12) through an intermediate position P22 (FIG. 11). The initial position P20 (FIG. 10) corresponds to the closed position P10 (FIG. 3) of the movable member 26. The actuated position P21 (FIG. 12) corresponds to the first open position P11 (FIG. 3) of the movable member 26. The intermediate position P22 (FIG. 11) corresponds to the second open position P12 (FIG. 3) of the movable member 26.

Figure 13:
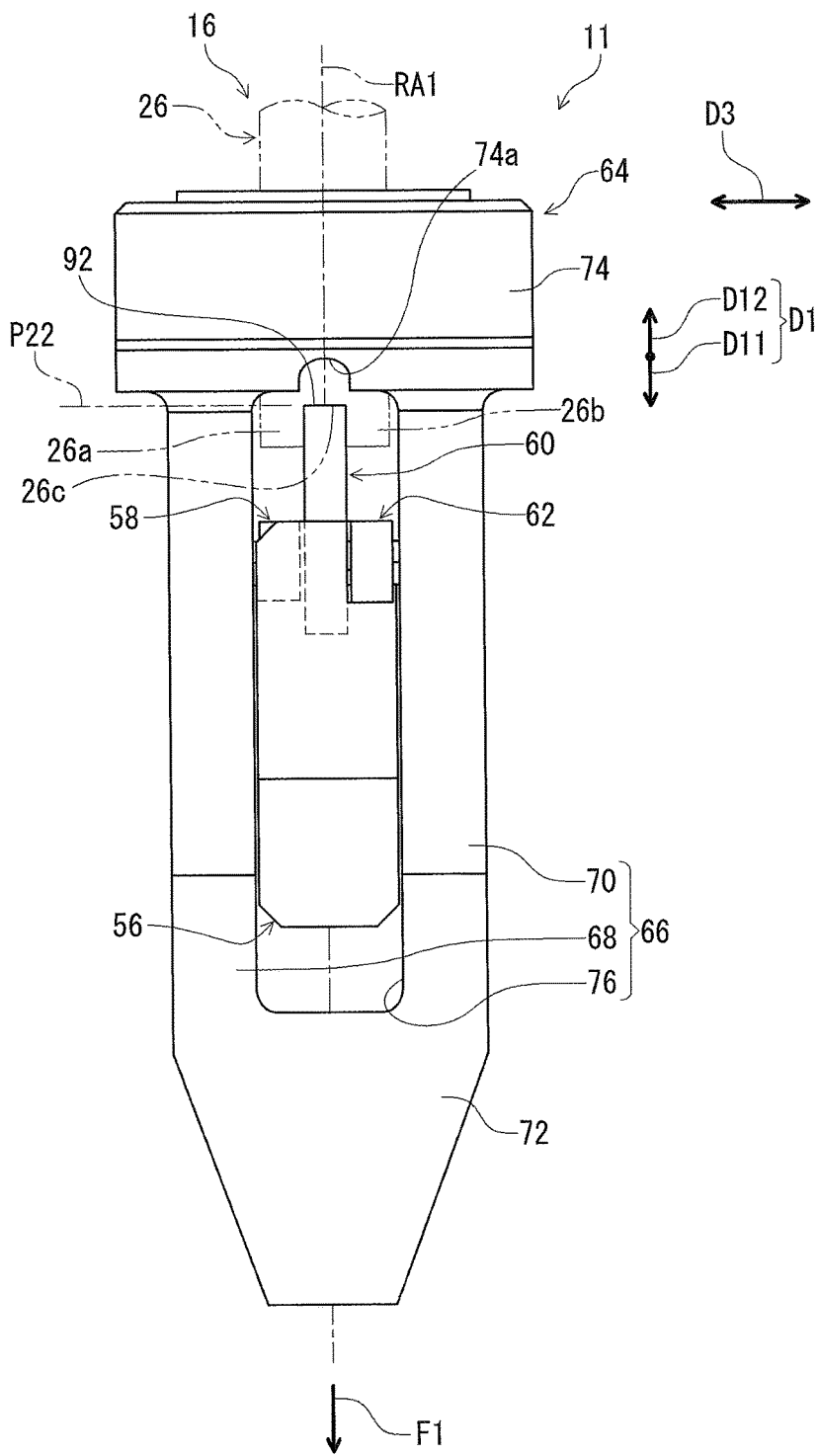
FIG. 13 is a side elevational view of the bicycle actuation structure illustrated in FIG. 9 (the intermediate position).

As seen in FIGS. 9 and 13, the supporting member 64 includes a guiding part 66 to guide at least one of the input member 56, the coupling member 58, and the output member 60. In this embodiment, the guiding part 66 guides the input member 56, the coupling member 58, and the additional coupling member 62. However, the guiding part 66 can be omitted from the supporting member 64. For example, the at least one of the input member 56, the coupling member 58, and the output member 60 can be guided by other members such as the first cylinder 12.

The guiding part 66 includes a first guiding portion 68 and a second guiding portion 70 spaced apart from the first guiding portion 68. The at least one of the input member 56, the coupling member 58, and the output member 60 is provided between the first guiding portion 68 and the second guiding portion 70. The first guiding portion 68 and the second guiding portion 70 restrict a movement of the at least one of the input member 56, the coupling member 58, and the output member 60 in a third direction D3 parallel to the first pivot axis A1.

In this embodiment, the input member 56, the coupling member 58, and the output member 60 are provided between the first guiding portion 68 and the second guiding portion 70. The first guiding portion 68 and the second guiding portion 70 restrict the movement of the input member 56, the coupling member 58, and the output member 60 in the third direction D3.

While the guiding part 66 includes the first guiding portion 68 and the second guiding portion 70 in this embodiment, one of the first guiding portion 68 and the second guiding portion 70 can be omitted from the guiding part 66.

The supporting member 64 includes a first base portion 72 and a second base portion 74. The first base portion 72 is spaced apart from the second base portion 74 in the first direction D11. The first guiding portion 68 and the second guiding portion 70 are provided between the first base portion 72 and the second base portion 74. The first guiding portion 68 and the second guiding portion 70 couple the first base portion 72 to the second base portion 74. The supporting member 64 includes a guide slit 76 defined between the first guiding portion 68 and the second guiding portion 70. The first guiding portion 68 includes a first opening 77a. The second guiding portion 70 includes a second opening 77b.

As seen in FIG. 10, the first base portion 72 includes an outer-casing attachment part 78. The outer-casing attachment part 78 includes a first attachment hole 80 and a second attachment hole 82. The first attachment hole 80 is connected with the second attachment hole 82. The first attachment hole 80 has an inner diameter larger than the second attachment hole 82. An end of an outer casing 3a of the control cable 3 is provided in the first attachment hole 80. An inner wire 3b of the control cable 3 extends through the second attachment hole 82. The second base portion 74 is secured to the first cylinder 12 and includes an opening 84. The movable member 26 extends through the opening 84. The first attachment hole 80, the second attachment hole 82, and the opening 84 are coaxial with each other. The second base portion 74 includes a groove 74a. As seen in FIG. 12, the output member 60 is partly provided in the groove 74a in a state where the output member 60 is positioned at the actuated position P21.

Figure 14:
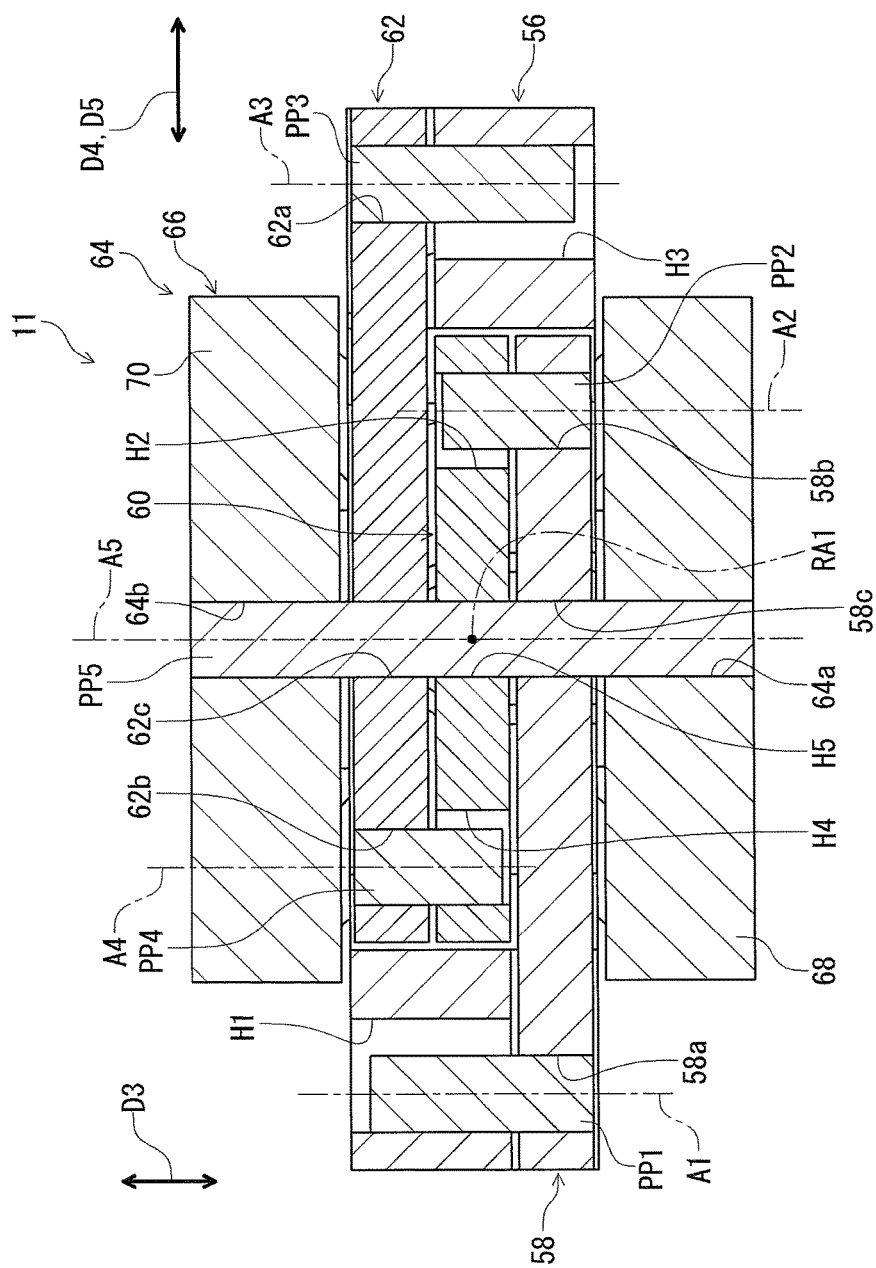
FIG. 14 is a cross-sectional view of the bicycle actuation structure taken along line XIV-XIV of FIG. 11 (the intermediate position).

As seen in FIGS. 10 and 14, the bicycle actuation structure 11 further comprises a first pivot pin PP1 pivotally coupling the coupling member 58 to the input member 56 about the first pivot axis A1. At least one of the input member 56 and the coupling member 58 includes a first elongated hole H1. In this embodiment, the input member 56 includes the first elongated hole H1. The first pivot pin PP1 extends through the first elongated hole H1. The first elongated hole H1 extends in a fourth direction D4 (FIG. 14) perpendicular to each of the first pivot axis A1 and the first direction D11.

As seen in FIG. 14, the first pivot pin PP1 defines the first pivot axis A1. In this embodiment, the first pivot pin PP1 is secured to the coupling member 58. The coupling member 58 includes a first through-hole 58a. The first pivot pin PP1 is fitted in the first through-hole 58a. While the input member 56 includes the first elongated hole H1 in this embodiment, the coupling member 58 can include the first elongated hole H1. Furthermore, each of the output member 60 and the coupling member 58 can include an elongated hole.

In this embodiment, the first pivot pin PP1 is a separate member from the input member 56 and the coupling member 58. However, the first pivot pin PP1 can be integrally provided with one of the input member 56 and the coupling member 58 as a one-piece unitary member. The first elongated hole H1 can extend in a direction other than the fourth direction D4.

As seen in FIGS. 10 and 14, the bicycle actuation structure 11 further comprises a second pivot pin PP2 pivotally coupling the output member 60 to the coupling member 58 about the second pivot axis A2. At least one of the coupling member 58 and the output member 60 includes a second elongated hole H2. In this embodiment, the output member 60 includes the second elongated hole H2. The second pivot pin PP2 extends through the second elongated hole H2. The second elongated hole H2 extends in a fifth direction D5 perpendicular to each of the second pivot axis A2 and the second direction D12. While the fifth direction D5 is parallel to the fourth direction D4 in this embodiment, the fifth direction D5 can be different from the fourth direction D4.

As seen in FIG. 14, the second pivot pin PP2 defines the second pivot axis A2. In this embodiment, the second pivot pin PP2 is secured to the coupling member 58. The coupling member 58 includes a second through-hole 58b. The second pivot pin PP2 is fitted in the second through-hole 58b. While the output member 60 includes the second elongated hole H2 in this embodiment, the coupling member 58 can include the second elongated hole H2. Each of the output member 60 and the coupling member 58 can include an elongated hole.

In this embodiment, the second pivot pin PP2 is a separate member from the output member 60 and the coupling member 58. However, the second pivot pin PP2 can be integrally provided with one of the output member 60 and the coupling member 58 as a one-piece unitary member. The second elongated hole H2 can extend in a direction other than the fifth direction D5.

As seen in FIGS. 10 and 14, the bicycle actuation structure 11 further comprises a third pivot pin PP3 pivotally coupling the additional coupling member 62 to the input member 56 about the third pivot axis A3. At least one of the input member 56 and the additional coupling member 62 includes a third elongated hole H3. In this embodiment, the input member 56 includes the third elongated hole H3. The third pivot pin PP3 extends through the third elongated hole H3. The third elongated hole H3 extends in the fourth direction D4 (FIG. 14).

As seen in FIG. 14, the third pivot pin PP3 defines the third pivot axis A3. In this embodiment, the third pivot pin PP3 is secured to the additional coupling member 62. The additional coupling member 62 includes a third through-hole 62a. The third pivot pin PP3 is fitted in the third through-hole 62a. While the input member 56 includes the third elongated hole H3 in this embodiment, the additional coupling member 62 can include the third elongated hole H3. Furthermore, each of the output member 60 and the additional coupling member 62 can include an elongated hole.

In this embodiment, the third pivot pin PP3 is a separate member from the input member 56 and the additional coupling member 62. However, the third pivot pin PP3 can be integrally provided with one of the input member 56 and the additional coupling member 62 as a one-piece unitary member. The third elongated hole H3 can extend in a direction other than the fourth direction D4.

As seen in FIGS. 10 and 14, the bicycle actuation structure 11 further comprises a fourth pivot pin PP4 pivotally coupling the additional coupling member 62 to the output member 60 about the fourth pivot axis A4. At least one of the output member 60 and the additional coupling member 62 includes a fourth elongated hole H4. In this embodiment, the output member 60 includes the fourth elongated hole H4. The fourth pivot pin PP4 extends through the fourth elongated hole H4. The fourth elongated hole H4 extends in the fifth direction D5 (FIG. 14).

As seen in FIG. 14, the fourth pivot pin PP4 defines the fourth pivot axis A4. In this embodiment, the fourth pivot pin PP4 is secured to the additional coupling member 62. The additional coupling member 62 includes a third through-hole 62a. The fourth pivot pin PP4 is fitted in the third through-hole 62a. While the output member 60 includes the fourth elongated hole H4 in this embodiment, the additional coupling member 62 can include the fourth elongated hole H4. Furthermore, each of the output member 60 and the additional coupling member 62 can include an elongated hole.

In this embodiment, the fourth pivot pin PP4 is a separate member from the output member 60 and the additional coupling member 62. However, the fourth pivot pin PP4 can be integrally provided with one of the output member 60 and the additional coupling member 62 as a one-piece unitary member. The fourth elongated hole H4 can extend in a direction other than the fifth direction D5.

As seen in FIGS. 10 and 14, the bicycle actuation structure 11 further comprises a support pivot pin PP5 pivotally coupling the coupling member 58 to the supporting member 64 about the support pivot axis A5. The output member 60 includes a support elongated hole H5. The support pivot pin PP5 extends through the support elongated hole H5. The support elongated hole H5 extends in the second direction D12.

As seen in FIG. 14, the support pivot pin PP5 defines the support pivot axis A5. In this embodiment, the support pivot pin PP5 is secured to the supporting member 64. The supporting member 64 includes a first support hole 64a and a second support hole 64b. The support pivot pin PP5 is fitted in the first support hole 64a and the second support hole 64b. The coupling member 58 includes a third support hole 58c. The additional coupling member 62 includes a fourth support hole 62c. The support pivot pin PP5 is rotatably provided in the third support hole 58c and the fourth support hole 62c.

In this embodiment, the support pivot pin PP5 is separate member from the coupling member 58, the additional coupling member 62, and the supporting member 64. However, the support pivot pin PP5 can be integrally provided with one of the coupling member 58, the additional coupling member 62, and the supporting member 64 as a one-piece unitary member.

The output member 60 is movable relative to the support pivot axis A5 along the support elongated hole H5. While the support elongated hole H5 is provided at the output member 60 in this embodiment, the support elongated hole H5 can be provided at the input member 56. The support elongated hole H5 can have other shapes such as a round shape. The support elongated hole H5 can extend in a direction other than the second direction D12.

As seen in FIG. 10, the input member 56 includes a cable attachment part 86 configured to be coupled to the control cable 3. An end of the inner wire 3b of the control cable 3 is coupled to the cable attachment part 86. In this embodiment, the cable attachment part 86 includes an attachment recess 88 and an attachment slit 90. The control cable 3 includes a coupling element 3c (nipple) secured to the end of the inner wire 3b. The coupling element 3b is provided in the attachment recess 88. The inner wire 3b extends through the attachment slit 90.

The output member 60 includes a transmitting part 92 to transmit a movement of the output member 60 in the second direction D12 to a receiving member. In this embodiment, the transmitting part 92 transmits the movement of the output member 60 in the second direction D12 to the movable member 26. The output member 60 outputs a pushing force F2 to the receiving member 26. The movable member 26 can also be referred to as the receiving member 26.

As seen in FIG. 13, the transmitting part 92 is engaged with a lower end of the receiving member 26 when the bicycle actuation structure 11 is mounted to the first cylinder 12 (FIG. 2). The receiving member 26 includes a first engagement part 26a and a second engagement part 26b. The first engagement part 26a is spaced apart from the second engagement part 26b to define an engagement recess 26c between the first engagement part 26a and the second engagement part 26b. The transmitting part 92 is provided between the first engagement part 26a and the second engagement part 26b and in the engagement recess 26c. The biasing element 34 (FIG. 2) pushes the receiving member 26 against the transmitting part 92 in the first direction D11.

As seen in FIGS. 10 to 12, the input member 56 is movable on a reference axis RA1 in the first direction D11 when viewed from the third direction D3 (FIG. 9) parallel to the first pivot axis A1. The output member 60 is movable on the reference axis RA1 in the second direction D12 when viewed from the third direction D3. In this embodiment, the input member 56 is movable on the reference axis RA1 relative to the supporting member 64 in the first direction D11 when viewed from the third direction D3. The output member 60 is movable on the reference axis RA1 relative to the supporting member 64 in the second direction D12 when viewed from the third direction D3. However, at least one of the input member 56 and the output member 60 can be offset from the reference axis RA1 when viewed from the third direction D3.

The cable attachment part 86 is movable on the reference axis RA1 in the first direction D11 when viewed from the third direction D3 parallel to the first pivot axis A1. The transmitting part 92 is movable on the reference axis RA1 in the second direction D12 when viewed from the third direction D3. In this embodiment, the cable attachment part 86 is movable on the reference axis RA1 relative to the supporting member 64 in the first direction D11 when viewed from the third direction D3. The transmitting part 92 is movable on the reference axis RA1 relative to the supporting member 64 in the second direction D12 when viewed from the third direction D3.

The coupling member 58 and the additional coupling member 62 are provided symmetrically with respect to the reference axis RA1 when viewed from the third direction D3. In this embodiment, the reference axis RA1 intersects with the support pivot axis A5. The coupling member 58 and the additional coupling member 62 can be provided asymmetrically with respect to the reference axis RA1 when viewed from the third direction D3.

Figure 15:
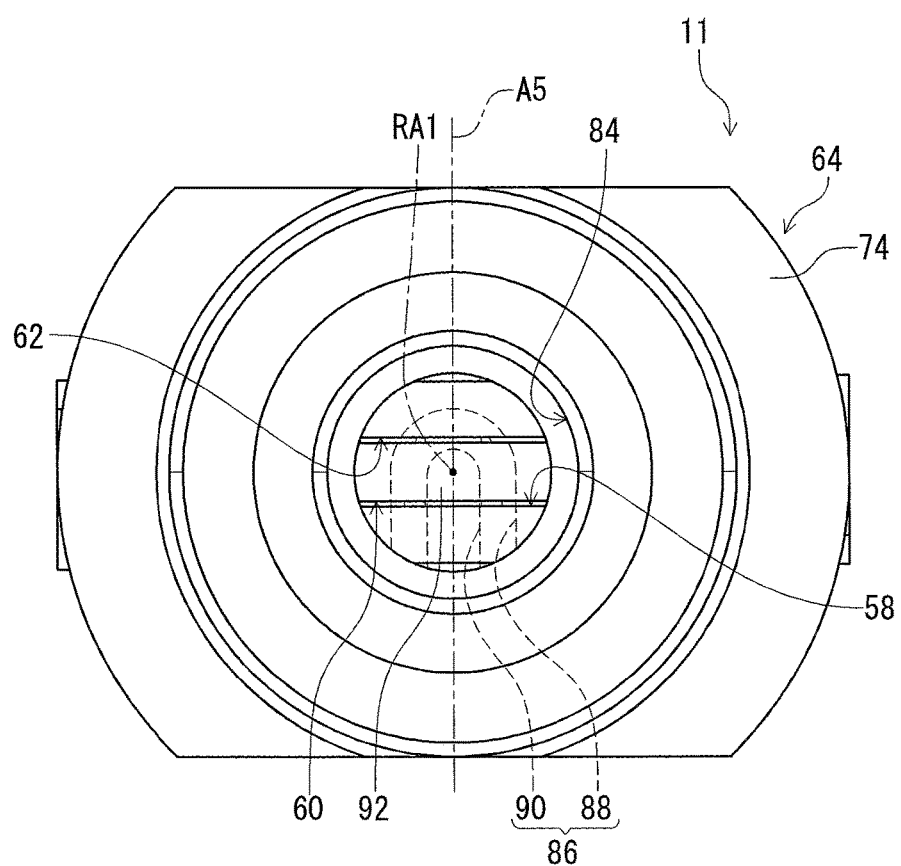
FIG. 15 is a top view of the bicycle actuation structure illustrated in FIG. 9 (the intermediate position).

As seen in FIG. 15, the cable attachment part 86 and the transmitting part 92 overlap with each other when viewed from the first direction D11. In this embodiment, the attachment recess 88 and the attachment slit 90 overlap with the transmitting part 92 when viewed from the first direction D11. The cable attachment part 86 and the transmitting part 92 overlaps with the reference axis RA1 when viewed from the first direction D11. The reference axis RA1 is provided in the attachment recess 88 and the attachment slit 90. The cable attachment part 86 and the transmitting part 92 can be arranged not to overlap with each other when viewed from the first direction D11.

Figure 16:
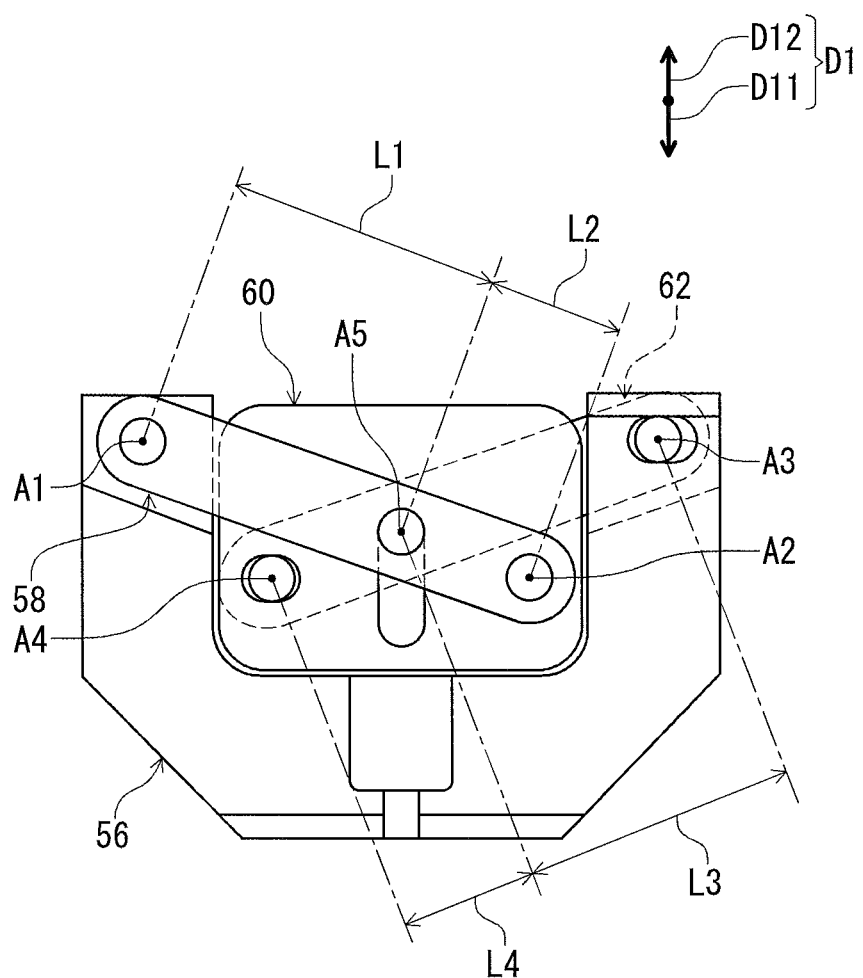
FIG. 16 shows positional relationship between pivot axes of the bicycle actuation structure illustrated in FIG. 9 (the intermediate position).

As seen in FIG. 16, a first distance L1 defined between the first pivot axis A1 and the support pivot axis A5 is longer than a second distance L2 defined between the second pivot axis A2 and the support pivot axis A5. A third distance L3 defined between the third pivot axis A3 and the support pivot axis A5 is longer than a fourth distance L4 defined between the fourth pivot axis A4 and the support pivot axis A5. However, the first distance L1 can be equal to or shorter than the second distance L2. The third distance L3 can be equal to or shorter than the fourth distance L4. In a case where the first distance L1 is shorter than the second distance L2, an amount of movement of the output member 60 increases while the pushing force F2 increases compared with the illustrated embodiment. In a case where the third distance L3 is shorter than the fourth distance L4, an amount of movement of the output member 60 increases while the pushing force F2 increases compared with the illustrated embodiment.

The operation of the bicycle seatpost assembly 10 will be described in detail below.

As seen in FIG. 2, in a state where the overall length of the bicycle seatpost assembly 10 is the maximum overall length L0, the third seal member 46 is disposed radially inward of the recesses 24b of the inner tube 24. In this state, as seen in FIG. 4, the third gate G3 is open to connect the first chamber C1 to the intermediate chamber C12. The first chamber C1 is in communication with the second valve chamber VC2 via the third gate G3, the intermediate chamber C12, and the third through-holes H13 in the closed state where the movable member 26 is positioned at the closed position P10.

As seen in FIGS. 10 and 11, the output member 60 of the bicycle actuation structure 11 is moved from the initial position P20 to the intermediate position P22, when the operated member 4 (FIG. 2) of the operating device 2 is operated to the second operated position P2 by the user. Thus, as seen in FIG. 6, the movable member 26 is moved from the closed position P10 to the second open position P12. This opens the second gate G2 to connect the first chamber C1 to the third chamber C3 via the second passageway PW2. This allows the substantially incompressible fluid to flow between the first chamber C1 and the third chamber C3 via the second passageway PW2.

When the rider's weight is applied to the second cylinder 14 via the mounting structure 15 (FIG. 2), fluid pressure increases in the first chamber C1. This causes the substantially incompressible fluid to flow from the first chamber C1 to the third chamber C3 via the second passageway PW2. At this time, the piston 40 is pressed toward the biasing chamber C4 relative to the first cylinder 12, causing the compressible fluid to be compressed in the biasing chamber C4. This allows the second cylinder 14 to be downwardly moved relative to the first cylinder 12 using the rider's weight (FIGS. 6 and 7).

On the other hand, when the rider's weight is released from the second cylinder 14, the compressible fluid compressed in the biasing chamber C4 biases the second cylinder 14 to upwardly move relative to the first cylinder 12 in the telescopic direction D1. This causes the substantially incompressible fluid to flow from the third chamber C3 to the first chamber C1 via the second passageway PW2. The second cylinder 14 is upwardly moved relative to the first cylinder 12 while the rider's weight is released from the second cylinder 14.

As seen in FIG. 4, the second gate G2 is closed when the movable member 26 returns to the closed position P10, causing the substantially incompressible fluid to stop flowing between the first chamber C1 and the third chamber C3 via the second passageway PW2 (FIG. 6). This allows the second cylinder 14 to be positioned at any position within the second adjustable range AR2 (FIG. 2) corresponding to the range RG1 of the recesses 24b.

As seen in FIG. 8, when the third seal member 46 reaches the upper side of the recesses 24b, the third seal member 46 comes in contact with the inner peripheral surface 42a of the inner tube 24 along the inner whole periphery of the inner tube 24. This causes the third gate G3 to be closed so that the substantially incompressible fluid stops flowing from the first chamber C1 to the third chamber C3. This allows the second cylinder 14 to be positioned at a position corresponding to the intermediate overall length L2 (FIG. 2) relative to the first cylinder 12 by operating the operated member 4 of the operating device 2. The second cylinder 14 does not move relative to the first cylinder 12 in the telescopic direction D1 until the first gate G1 is open.

As seen in FIGS. 11 and 13, the output member 60 of the bicycle actuation structure 11 is moved from the initial position P20 to the actuated position P21, when the operated member 4 (FIG. 2) of the operating device 2 is operated to the first operated position P1 by the user. Thus, as seen FIG. 5, the movable member 26 is moved from the closed position P10 to the first open position P11. This opens the first gate G1 and the second gate G2 to connect the first chamber C1 to the third chamber C3 via the first passageway PW1. This allows the substantially incompressible fluid to flow between the first chamber C1 and the second chamber C2 via the first passageway PW1 and the second passageway PW2. However, the positioning structure 16 can have such a construction that the second passageway PW2 is closed in a state where the first passageway PW1 is open.

When the rider's weight applied to the second cylinder 14, the fluid pressure increases in the first chamber C1. This causes the substantially incompressible fluid to flow from the first chamber C1 to the third chamber C3 via the first passageway PW1. At this time, the piston 40 is pressed toward the biasing chamber C4 relative to the first cylinder 12, causing the compressible fluid to be compressed in the biasing chamber C4. This allows the second cylinder 14 to be downwardly moved relative to the first cylinder 12 using the rider's weight.

On the other hand, when the rider's weight is released from the second cylinder 14, the compressible fluid compressed in the biasing chamber C4 biases the second cylinder 14 to upwardly move relative to the first cylinder 12 in the telescopic direction D1. This causes the substantially incompressible fluid to flow from the third chamber C3 to the first chamber C1 via the first passageway PW1. The second cylinder 14 is upwardly moved relative to the first cylinder 12 while the rider's weight is released from the second cylinder 14.

The first gate G1 and the second gate G2 are closed when the movable member 26 returns to the closed position P10 (FIG. 4), causing the substantially incompressible fluid to stop flowing between the first chamber C1 and the third chamber C3 via the first passageway PW1 (FIG. 5). Accordingly, a relative position between the first cylinder 12 and the second cylinder 14 can be continuously adjusted regardless of the recesses 24b in the first open state where the movable member 26 is disposed at the first open position P11.

The bicycle seatpost assembly 10 and the bicycle actuation structure 11 have the following features.

(1) The output member 60 is pivotally coupled to the coupling member 58 about the second pivot axis A2 to move in the second direction D12 opposite to the first direction D11 in response to the movement of the input member 56 in the first direction D11. Accordingly, it is possible to effectively convert the pulling force F1 into the pushing force F2.

(2) The output member 60 includes the transmitting part 92 to transmit the movement of the output member 60 in the second direction to the receiving member 26. Accordingly, it is possible to move the receiving member in the second direction D12 by transmitting the movement of the output member 60 to the receiving member via the transmitting part 92.

(3) Since the second direction D12 is substantially parallel to the first direction D11, it is possible to effectively convert the pulling force F1 into the pushing force F2 in an opposite direction of the pulling force F1.

(4) The input member 56 is movable on the reference axis RA1 in the first direction D11 when viewed from a third direction D3 parallel to the first pivot axis A1. The output member 60 is movable on the reference axis RA1 in the second direction D12 when viewed from the third direction D3. Accordingly, it is possible to more effectively convert the pulling force F1 into the pushing force F2 compared with a case where the output member 60 is offset from the reference axis RA1 in the second direction D12 viewed from the third direction D3.

(5) The cable attachment part 86 and the transmitting part 92 overlapping with each other when viewed from the first direction D11. Accordingly, it is possible to it is possible to more effectively convert the pulling force F1 into the pushing force F2 compared with a case where the cable attachment part 86 and the transmitting part 92 do not overlap with each other when viewed from the first direction D11.

(6) The coupling member 58 is pivotally coupled to the supporting member 64 about the support pivot axis A5 provided between the first pivot axis A1 and the second pivot axis A2. Accordingly, it is possible to stabilize the movement of the coupling member 58 by the supporting member 64. This can improve a conversion efficiency of force compared with a case where the bicycle actuation structure 11 does not include the support member.

(7) Since the supporting member 64 includes the guiding part 66 to guide at least one of the input member 56, the coupling member 58, and the output member 60, it is possible to stabilize the movement of at least one of the input member 56, the coupling member 58, and the output member 60 by the guiding part 66. This can improve the conversion efficiency of force compared with a case where the support member does not include the guiding part 66.

(8) The first guiding portion 68 and the second guiding portion 70 restrict the movement of the at least one of the input member 56, the coupling member 58, and the output member 60 in the third direction D3. Accordingly, it is possible to reduce loss of the movement of the at least one of the input member 56, the coupling member 58, and the output member 60. This can improve the conversion efficiency of force compared with a case where the guiding part 66 does not include the first guiding portion 68 and the second guiding portion 70.

(9) Since the first distance L1 is longer than the second distance L2, it is possible to make the pushing force F2 larger than the pulling force F1.

(10) Since the support pivot pin PP5 extends through the support elongated hole H5, it is possible to guide the output member 60 by the support pivot pin PP5 and the support elongated hole H5. This can stabilize the movement of the output member 60.

(11) Since the support elongated hole H5 extends in the second direction D12, it is possible to stabilize the movement of the output member 60 in the second direction D12. This can improve the conversion efficiency of force compared with a case where the support elongated hole H5 extends in a direction other than the second direction D12.

(12) Since the first pivot pin PP1 extends through the first elongated hole H1, the first elongated hole H1 can reduce interference between the first pivot pin PP1 and the coupling member 58. This can make the movement of the input member 56 and the coupling member 58 smoother than a case where the first pivot pin PP1 extends through a round hole.

(13) Since the first elongated hole H1 extends in the fourth direction D4, it is possible to more improve the conversion efficiency of force with reducing interference between the first pivot pin PP1 and the coupling member 58 compared with a case where the first elongated hole H1 extends in a direction other than the fourth direction D4.

(14) Since the second pivot pin PP2 extends through the second elongated hole H2, the second elongated hole 112 can reduce interference between the second pivot pin PP2 and the coupling member 58. This can make the movement of the input member 56 and the coupling member 58 smoother than a case where the second pivot pin PP2 extends through a round hole.

(15) Since the second elongated hole H2 extends in the fifth direction D5, it is possible to more improve the conversion efficiency of force with reducing interference between the second pivot pin PP2 and the coupling member 58 compared with a case where the second elongated hole H2 extends in a direction other than the fifth direction D5.

(16) The coupling member 58 and the additional coupling member 62 are provided symmetrically with respect to the reference axis RA1 when viewed from the third direction D3. Accordingly, the additional coupling member 62 can improve the coupling strength of the bicycle actuation structure 11 compared with a case where the bicycle actuation structure 11 does not include the additional coupling member 62.

(17) The output member 60 is operatively coupled to the positioning structure 16 to change the state of the bicycle seatpost assembly 10 between the locked state and the adjustable state in response to the movement of the input member 56. Accordingly, it is possible to effectively convert the pulling force F1 into the pushing force F2 in the bicycle actuation structure 11. Accordingly, it is possible to change the state of the positioning structure 16 via the bicycle actuation structure 11 by moving the input member 56.

(18) The output member 60 is operatively coupled to the hydraulic valve 20 to operate the hydraulic valve 20 in response to the movement of the input member 56. Accordingly, it is possible to transmit the movement of the input member 56 to the hydraulic valve 20 via the coupling member 58 and the output member 60.

(19) The bicycle actuation structure 11 is provided at the lower end 18 of the first cylinder 12 in a state where the bicycle seatpost assembly 10 is mounted to the bicycle frame 1. Accordingly, it is possible to arrange the bicycle actuation structure 11 in the bicycle frame, improving an appearance of a bicycle with effectively converting the pulling force F1 into the pushing force F2 in the bicycle actuation structure 11.

Second Embodiment

A bicycle seatpost assembly 210 in accordance with a second embodiment will be described below referring to FIG. 17. The bicycle seatpost assembly 210 has substantially the same structures as those of the bicycle seatpost assembly 10 except for the positioning structure 16. Thus, elements having substantially the same function as those in the first embodiment will be numbered the same here, and will not be described and/or illustrated again in detail here for the sake of brevity.

Figure 17:
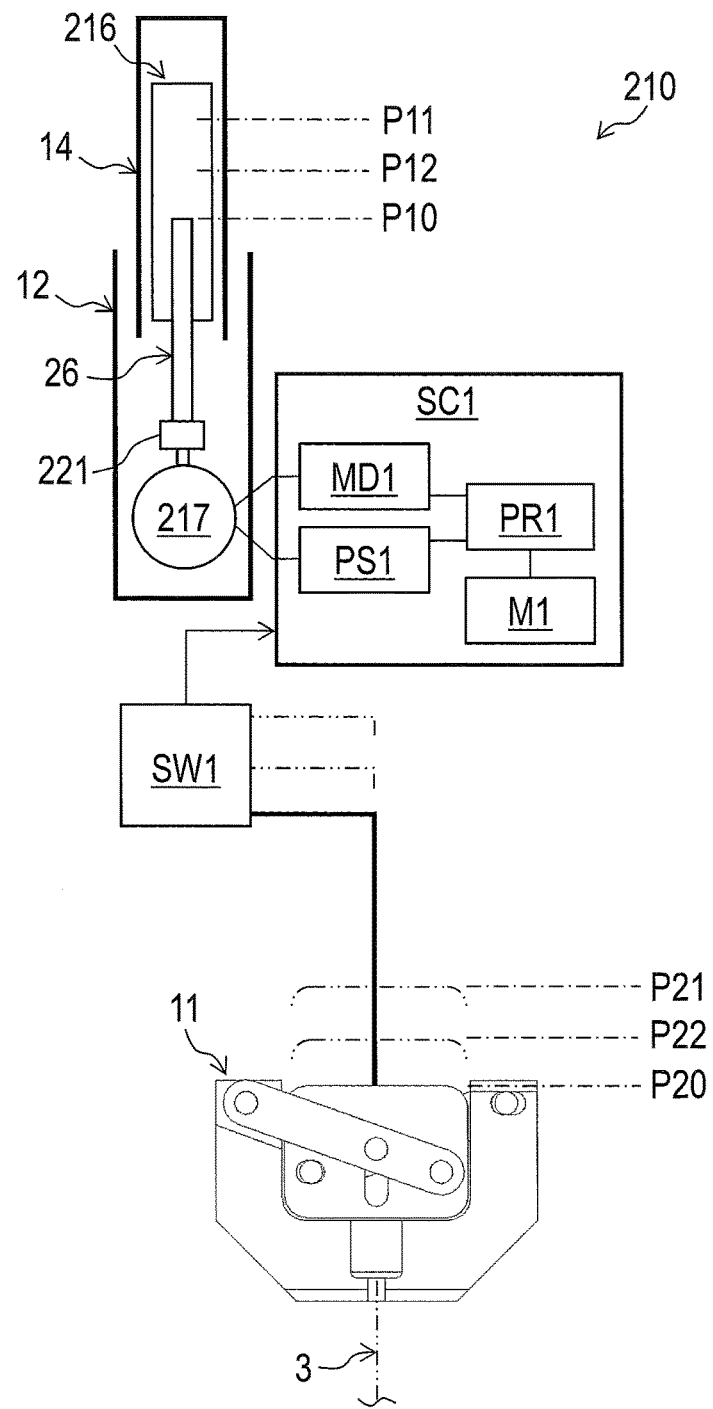
FIG. 17 is a schematic block diagram of a bicycle actuation structure in accordance with a second embodiment.

As seen in FIG. 17, the bicycle seatpost assembly 210 includes a positioning structure 216. The positioning structure 216 includes a motor 217 to change the state of the bicycle seatpost assembly 210 between the locked state and the adjustable state. The output member 60 is operatively coupled to the motor 217 to operate the motor in response to the movement of the input member 56. In this embodiment, the motor 217 changes the state of the bicycle seatpost assembly 210 among the locked state, the first adjustable state, and the second adjustable state. The positioning structure 216 includes an output member 221. The motor 217 moves the output member 221 relative to the first cylinder 12 in the telescopic direction D1. The output member 221 is in contact with the receiving member 26. The motor 217 moves the receiving member 26 via the output member 221 relative to the first cylinder 12 in the telescopic direction D1.

The bicycle seatpost assembly 210 includes a switch SW1 and a seatpost controller SC1. The switch SW1 and the seatpost controller SC1 are provided at the lower end of the first cylinder 12. In this embodiment, the switch SW1 includes a three-position switch having three positions corresponding to the initial position P20, the actuated position P21, and the intermediate position P22 of the bicycle actuation structure 11. The switch SW1 generates a first position signal when the output member 60 is positioned at the initial position P20. The switch SW1 generates a second position signal when the output member 60 is positioned at the actuated position P21. The switch SW1 generates a third position signal when the output member 60 is positioned at the intermediate position P22.

The seatpost controller SC1 is electrically connected to the motor 217 and the switch SW1. The seatpost controller SC1 controls the motor 217 to move the receiving member 26 relative to the first cylinder 12 in the telescopic direction D1 based on operations of the switch SW1. The seatpost controller SC1 includes a processor PR1, a memory M1, a position sensor PS1, and a motor driver MD1. The processor PR1 is electrically connected to the memory M1. The processor PR1 includes a central processing unit (CPU). The memory M1 stores programs and other information. The memory M1 includes a read only memory (ROM), a random access memory (RAM), and a memory controller. For example, a program stored in the memory M1 is read into the processor PR1, and thereby several functions of the seatpost controller SC1 are performed.

To determine a current state of the positioning structure 16, the position sensor PS1 senses a current position of the movable member 26 relative to the first cylinder 12 via the motor 217. Examples of the position sensor PS1 include a contact rotational position sensor such as a potentiometer, and a non-contact rotational position sensor such as an optical sensor (e.g., a rotary encoder) and a magnetic sensor (e.g., a hall sensor). The current position of the motor 217 is stored in the memory M1. The processor PR1 generates a control signal based on a signal of the switch SW1 and the current position of the motor 217.

The motor driver MD1 controls the motor 217 based on the control signal generated by the processor PR1. In this embodiment, the motor driver MD1 controls a rotational direction and/or a rotational speed of an output shaft of the motor 217 based on the control signal generated by the processor PR1.

When the output member 60 of the bicycle actuation structure 11 is positioned at the initial position P20, the seatpost controller SC1 controls the motor 217 to position the receiving member 26 at the closed position P10. When the output member 60 of the bicycle actuation structure 11 is positioned at the actuated position P21, the seatpost controller SC1 controls the motor 217 to position the receiving member 26 at the at the first open position P11. When the output member 60 of the bicycle actuation structure 11 is positioned at the intermediate position P22, the seatpost controller SC1 controls the motor 217 to position the receiving member 26 at the at the second open position P12.

With the bicycle seatpost assembly 210, it is possible to obtain substantially the same effects as those of the bicycle seatpost assembly 10 in accordance with the first embodiment.

Furthermore, the output member 60 is operatively coupled to the motor 217 to operate the motor 217 in response to the movement of the input member 56. Accordingly, it is possible to transmit the movement of the input member 56 to the motor 217 via the coupling member 58 and the output member 60. Thus, it is possible to operate the pulling the input member 56.

It will be apparent to those skilled in the bicycle field from the present disclosure that the structures and/or configurations of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle actuation structure comprising:
an input member configured to receive a pulling force to move in a first direction which is a straight direction;
a coupling member pivotally coupled to the input member about a first pivot axis; and
an output member pivotally coupled to the coupling member about a second pivot axis to move in a second direction opposite to the first direction in response to a movement of the input member in the first direction, the second direction being a straight direction, the second pivot axis being different from the first pivot axis.

2. The bicycle actuation structure according to claim 1, wherein the output member includes a transmitting part to transmit a movement of the output member in the second direction to a receiving member.

3. The bicycle actuation structure according to claim 1, wherein
the second direction is substantially parallel to the first direction.

4. The bicycle actuation structure according to claim 3, wherein
the input member is movable on a reference axis in the first direction when viewed from a third direction parallel to the first pivot axis, and
the output member is movable on the reference axis in the second direction when viewed from the third direction.

5. The bicycle actuation structure according to claim 4, wherein
the input member includes a cable attachment part configured to be coupled to a control cable,
the output member includes a transmitting part to transmit a movement of the output member in the second direction,
the cable attachment part is movable on the reference axis in the first direction when viewed from a third direction parallel to the first pivot axis,
the transmitting part is movable on the reference axis in the second direction when viewed from the third direction, and
the cable attachment part and the transmitting part overlap with each other when viewed from the first direction.

6. A bicycle actuation structure comprising:
an input member configured to receive a pulling force to move in a first direction;
a coupling member pivotally coupled to the input member about a first pivot axis;
an output member pivotally coupled to the coupling member about a second pivot axis to move in a second direction opposite to the first direction in response to a movement of the input member in the first direction, the second pivot axis being different from the first pivot axis; and
a supporting member,
the coupling member being pivotally coupled to the supporting member about a support pivot axis provided between the first pivot axis and the second pivot axis.

7. The bicycle actuation structure according to claim 6, wherein
the supporting member includes a guiding part to guide at least one of the input member, the coupling member, and the output member.

8. The bicycle actuation structure according to claim 7, wherein
the guiding part includes a first guiding portion and a second guiding portion spaced apart from the first guiding portion,
the at least one of the input member, the coupling member, and the output member is provided between the first guiding portion and the second guiding portion, and
the first guiding portion and the second guiding portion restrict a movement of the at least one of the input member, the coupling member, and the output member in a third direction parallel to the first pivot axis.

9. The bicycle actuation structure according to claim 6, wherein
a first distance defined between the first pivot axis and the support pivot axis is longer than a second distance defined between the second pivot axis and the support pivot axis.

10. The bicycle actuation structure according to claim 6, further comprising:
a support pivot pin pivotally coupling the coupling member to the supporting member about the support pivot axis, wherein
the output member includes a support elongated hole, and
the support pivot pin extends through the support elongated hole.

11. The bicycle actuation structure according to claim 10, wherein
the support elongated hole extends in the second direction.

12. The bicycle actuation structure according to claim 10, further comprising:
a first pivot pin pivotally coupling the coupling member to the input member about the first pivot axis, wherein
at least one of the input member and the coupling member includes a first elongated hole, and
the first pivot pin extends through the first elongated hole.

13. The bicycle actuation structure according to claim 12, wherein
the first elongated hole extends in a fourth direction perpendicular to each of the first pivot axis and the first direction.

14. The bicycle actuation structure according to claim 12, further comprising:
a second pivot pin pivotally coupling the output member to the coupling member about the second pivot axis, wherein
at least one of the coupling member and the output member includes a second elongated hole, and
the second pivot pin extends through the second elongated hole.

15. The bicycle actuation structure according to claim 14, wherein
the second elongated hole extends a fifth direction perpendicular to each of the second pivot axis and the second direction.

16. A bicycle actuation structure comprising:
an input member configured to receive a pulling force to move in a first direction;
a coupling member pivotally coupled to the input member about a first pivot axis;
an output member pivotally coupled to the coupling member about a second pivot axis to move in a second direction opposite to the first direction in response to a movement of the input member in the first direction, the second pivot axis being different from the first pivot axis; and
an additional coupling member pivotally coupled to the input member about a third pivot axis,
the second direction being substantially parallel to the first direction,
the input member being movable on a reference axis in the first direction when viewed from a third direction parallel to the first pivot axis,
the output member being movable on the reference axis in the second direction when viewed from the third direction,
the output member is pivotally coupled to the additional coupling member about a fourth pivot axis to move in the second direction in response to the movement of the input member in the first direction, and the coupling member and the additional coupling member are provided symmetrically with respect to the reference axis when viewed from the third direction.

17. A bicycle seatpost assembly comprising:
a first cylinder;
a second cylinder telescopically received in the first cylinder in a telescopic direction;
a positioning structure to change a state of the bicycle seatpost assembly between
    a locked state where the second cylinder is positioned relative to the first cylinder in the telescopic direction, and
    an adjustable state where a position of the second cylinder is adjustable relative to the first cylinder in the telescopic direction; and
a bicycle actuation structure comprising:
    an input member configured to receive a pulling force to move in a first direction;
    a coupling member pivotally coupled to the input member about a first pivot axis; and
    an output member pivotally coupled to the coupling member about a second pivot axis to move in a second direction opposite to the first direction in response to a movement of the input member in the first direction, the second pivot axis being different from the first pivot axis, the output member being operatively coupled to the positioning structure to change the state of the bicycle seatpost assembly between the locked state and the adjustable state in response to the movement of the input member.

18. The bicycle seatpost assembly according to claim 17, wherein
the positioning structure includes a hydraulic valve to change the state of the bicycle seatpost assembly between the locked state and the adjustable state, and
the output member is operatively coupled to the hydraulic valve to operate the hydraulic valve in response to the movement of the input member.

19. The bicycle seatpost assembly according to claim 17, wherein
the positioning structure includes a motor to change the state of the bicycle seatpost assembly between the locked state and the adjustable state, and
the output member is operatively coupled to the motor to operate the motor in response to the movement of the input member.

20. The bicycle seatpost assembly according to claim 17, wherein
the bicycle actuation structure is provided at a lower end of the first cylinder in a state where the bicycle seatpost assembly is mounted to a bicycle frame.

21. The bicycle actuation structure according to claim 1, wherein
the input member includes a cable attachment part configured to be coupled to a control cable.

* * * * *